United States Patent [19]

Havel

[11] Patent Number: 4,726,059
[45] Date of Patent: Feb. 16, 1988

[54] VARIABLE COLOR DISPLAY TELEPHONE

[76] Inventor: Karel Havel, P.O. Box 66, Station M, Toronto, Ontario, Canada, M6S 4T2

[21] Appl. No.: 839,526

[22] Filed: Mar. 14, 1986

[51] Int. Cl.$^4$ .............................................. H04M 1/26
[52] U.S. Cl. ....................................... 379/354; 379/396
[58] Field of Search ................. 179/81 C, 81 R, 84 L, 179/84 R, 99 LS, 90 AN, 90 BD, 90 K, 2 DP; 40/450, 451; 313/510; 340/815.03, 815.1, 713, 718; 379/142, 354, 368, 396, 200, 263, 164

[56] References Cited

U.S. PATENT DOCUMENTS

| | | | |
|---|---|---|---|
| 3,899,786 | 8/1975 | Greubel et al. | 340/815.1 |
| 4,160,879 | 7/1979 | Sullivan et al. | 179/90 AN |
| 4,274,217 | 6/1981 | Ohshima | 40/451 |

FOREIGN PATENT DOCUMENTS

| | | | |
|---|---|---|---|
| 2714316 | 10/1978 | Fed. Rep. of Germany | 40/451 |
| 0107984 | 8/1980 | Japan | 340/715 |

OTHER PUBLICATIONS

U.S. West, Knowledge Engineering, Oct. 1986 received, 1986 printing date.

Primary Examiner—James L. Dwyer

[57] ABSTRACT

A telephone with variable color display visually presents dialed telephone number in a color variable in accordance with the type of a telephone call, e.g, internal, external, local, long distance, and the like.

12 Claims, 45 Drawing Figures

VARIABLE COLOR DISPLAY TELEPHONE

CROSS-REFERENCE TO RELATED APPLICATIONS

This relates to my copending application Ser. No. 817,114, filed on Jan. 8, 1986, entitled Variable Color Digital Timepiece, now U.S. Pat. No. 4,647,217 issued on Mar. 3, 1987.

BACKGROUND OF THE INVENTION

1. Field of the Invention

This invention relates to telephones utilizing variable color display.

2. Description of the Prior Art

A display device that can change color and selectively display digits and characters is described in my U.S. Pat. No. 4,086,514, entitled Variable Color Display Device and issued on Apr. 25, 1978. This display device includes display areas arranged in a suitable display font, such as well known 7-segment display font, which may be selectively energized in groups to display all known characters. Each display segment includes three light emitting diodes for emitting light signals of respectively different primary colors, which are blended within the display segment to form a composite light signal. The color of the composite light signal can be controlled by selectively varying the portions of the primary light signals.

Commercially well known telephone has a capability to establish a telephone call of a selective type by dialing appropriate number. A telephone with monochromatic digital display, disclosed in U.S. Pat. No. 3,932,709 issued on Jan. 13, 1976 to Don G. Hoff et al., has additional capability to display dialed number in a single color to verify its correctness. When placing a long distance call, it is usually necessary to precede the local telephone number by appropriate area code. No provision is made in the prior art telephones for distinguishing between the area code portion and local number portion when displaying such a telephone number.

Telephone with variable color digital display is unknown.

SUMMARY OF THE INVENTION

In a broad sense, it is the principal object of this invention to provide a telephone with variable color display.

The invention endeavors to overcome problems of prior art display telephones by providing a new type of display telephone.

In the preferred embodiment, variable color display telephone is disclosed that visually presents dialed telephone numbers in a color variable in accordance with the type of a telephone call. In one embodiment, the telephone automatically visually presents calls internal and external to a predetermined telephone network in different colors. In another embodiment, the telephone automatically recognizes long distance call and visually presents its area code and local number portion in different colors.

It is another object of the invention to provide a device for interrogating the first dialed digit to determine the type of a telephone call.

It is further object of the invention to provide a method and device for moving digits visually presented in different colors on a variable color display such that each digit maintains its color when moved.

It is further object of the invention to provide a color select circuit whereby the telephone user can select two out of seven colors for illuminating the telephone display.

Still further objects of the invention will become obvious from the accompanying drawings and their description.

BRIEF DESCRIPTION OF THE DRAWINGS

In the drawings in which are shown several possible embodiments of the invention.

Throughout the drawings, like characters indicate like parts.

BRIEF DESCRIPTION OF THE CHARTS

Figure 38:
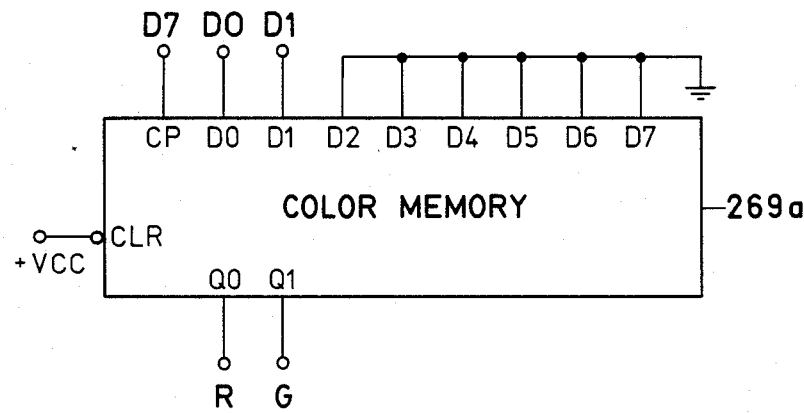
FIG. 38 is a detail of color memory for controlling the color of the telephone display in two steps.

In the charts which show examples of the relationship between the type of a telephone call and resulting color of the telephone display, CHART 1 shows the relationship between the first dialed digit, binary code stored in the color memory of FIG. 38, and resulting color of the telephone display.

Figure 39:
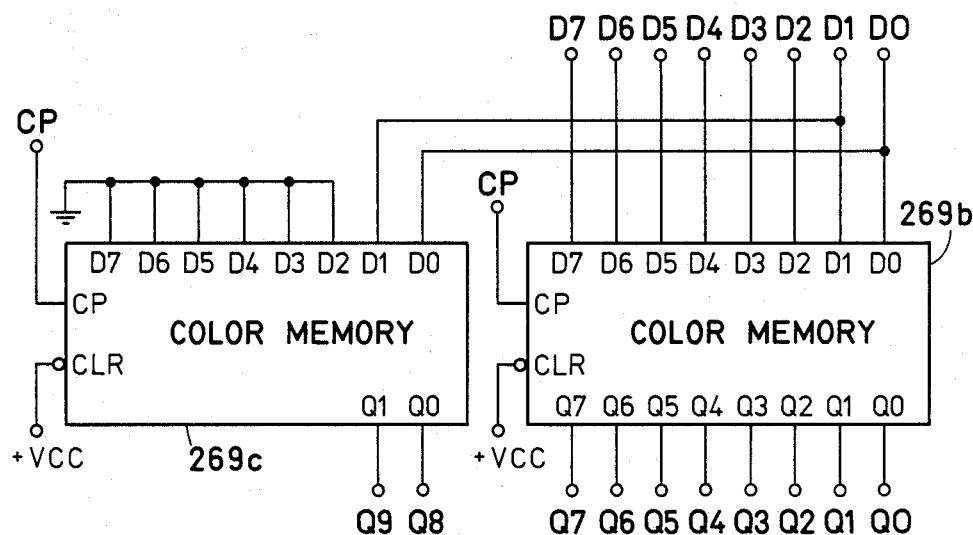
FIG. 39 is a detail of color memory for shifting color control signals.

CHART 2 shows the relationship between the number of dialed digits in a long distance call, binary code stored in the color memory of FIG. 39, and resulting color of respective displayed dialed digits.

DESCRIPTION OF THE PREFERRED EMBODIMENTS

Figure 1:
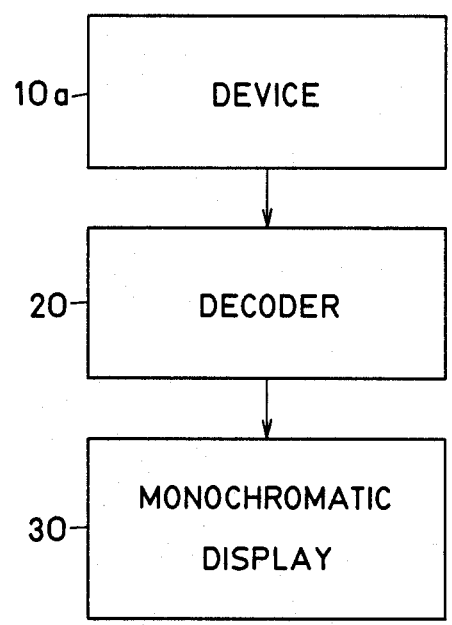
FIG. 1 is a block diagram of a typical prior art monochromatic display system.

Referring now, more particularly, to the drawings, in FIG. 1 is shown a block diagram of a typical prior art display system which usually includes a device 10a for developing digital data, a suitable decoder 20 for converting the digital data into a displayable code, and a monochromatic display 30 for indicating the digital data visually.

Figure 2:
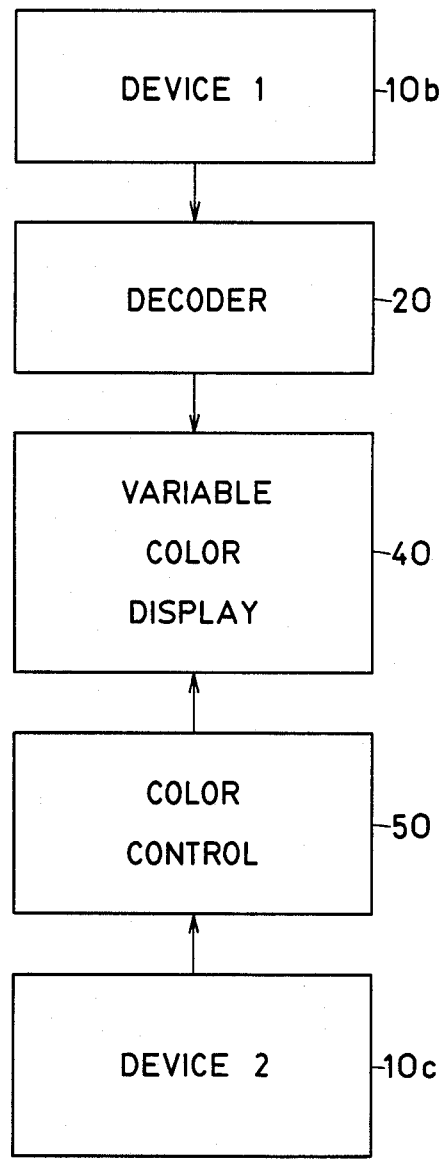
FIG. 2 is a generalized block diagram of variable color display system for the practice of the present invention.

As shown in FIG. 2, the present invention resides in the substitution of a commercially well known monochromatic display with variable color display 40, and in the addition of a color control circuit 50 for controlling the color of the display 40. The variable color display system of this invention can simultaneously indicate the values of two different quantities, from the outputs of respective devices 10b and 10c by causing the value of the first quantity to be visually presented, and by controlling the color of the display in accordance with the value of the second quantity.

Figure 3:
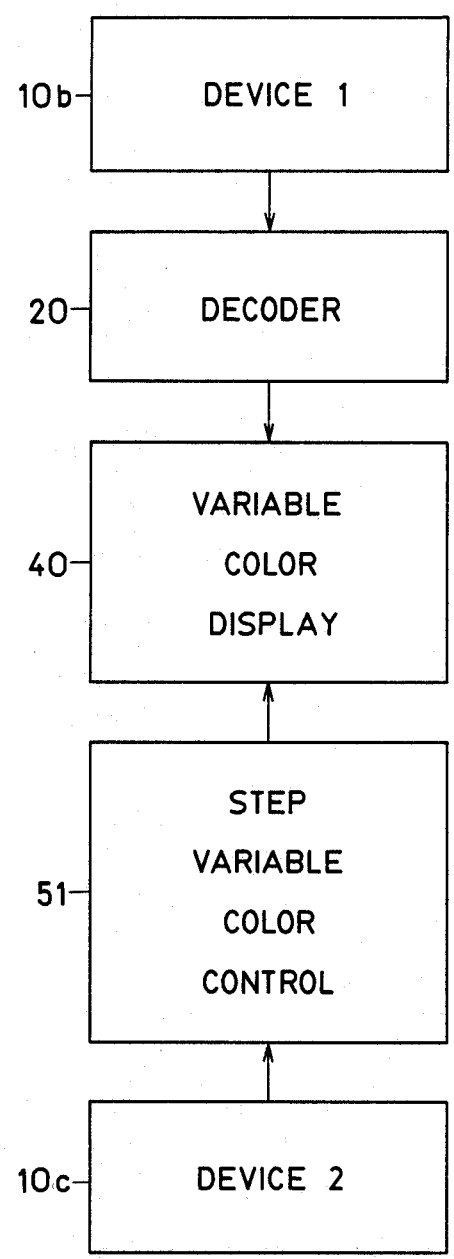
FIG. 3 is a block diagram of a step variable color display system.

In FIG. 3 is shown a block diagram of another embodiment of a variable color display system of the present invention, characterized by a step variable color control circuit 51.

Figure 4:
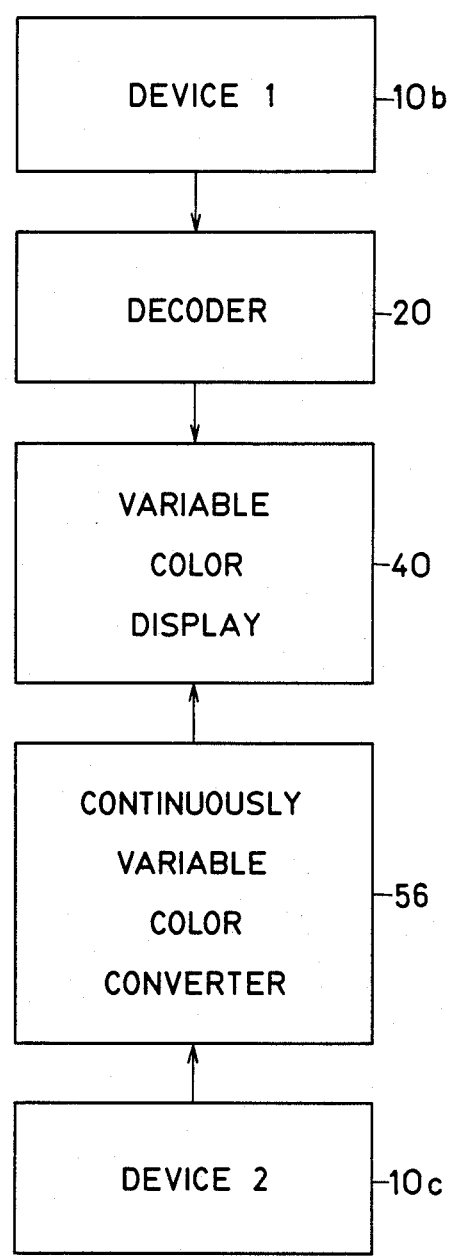
FIG. 4 is a block diagram of a continuously variable color display system.

In FIG. 4 is shown a block diagram of still another embodiment of variable color display system, characterized by a continuously variable color converter circuit 56.

Figure 5:
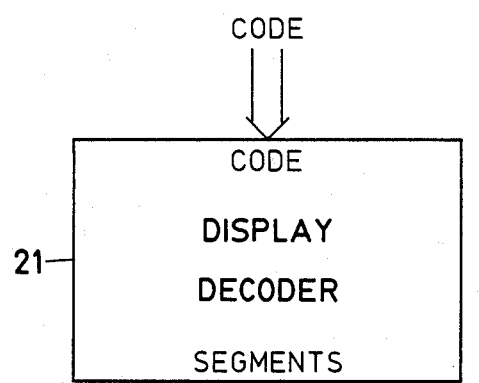
FIG. 5 is a block diagram of 2-primary color digital display.

In FIG. 5 is shown a block diagram of 2-primary color display system including a display decoder 21, variable color 2-LED display 46, and 2-primary color control logic circuit 52. The decoder 21 accepts at its inputs a code representing the character to be displayed and accordingly develops output drive signals to drive respective segments of the display 46. The color control circuit 52 accepts color control logic signals at its inputs R (red), Y (yellow), and G (green) and develops its outputs drive signals for the red bus 5 and green bus 6, respectively, to illuminate the display 46 in a selected color.

Figure 6:
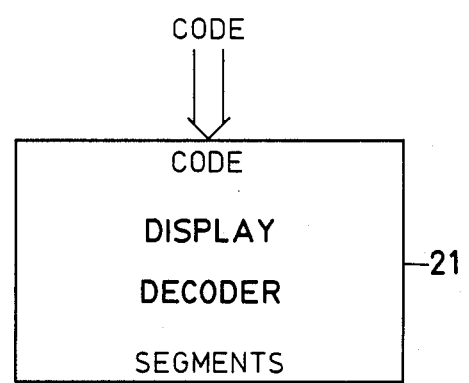
FIG. 6 is a block diagram of 3-primary color digital display.

In FIG. 6 is shown a block diagram of 3-primary color display system including a display decoder 21, variable color 3-LED display 47, and 3-primary color control logic circuit 53. The color control circuit 53 accepts color control logic signals at its inputs R (red), Y (yellow), G (green), BG (blue-green), B (blue), P (purple), and W (white) and develops at its outputs drive signals for the red bus 5, green bus 6, and blue bus 7, respectively, to illuminate the display 47 in a selected color.

Figure 7:
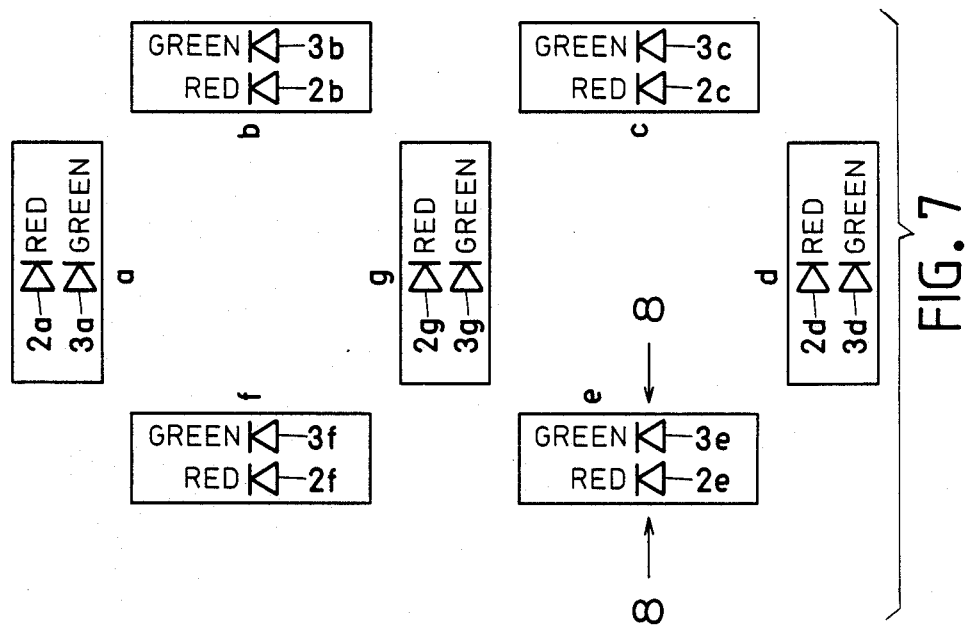
FIG. 7 is an enlarged detail of one digit of 2-primary color digital display.

In FIG. 7, the 2-primary color display element includes seven elongated display segments a, b, c, d, e, f, and g arranged in the conventional pattern, which may be selectively energized in different combinations to display the desired digits. Each display segment includes a pair of LEDs (light emitting diodes): a red LED 2 and green LED 3, which are closely adjacent such that the light signals emitted therefrom are substantially superimposed upon each other to mix the colors. To facilitate the illustration, the LEDs are designated by segment symbols, e.g., the red LED in the segment a is designated as 2a, etc.

Figure 8:
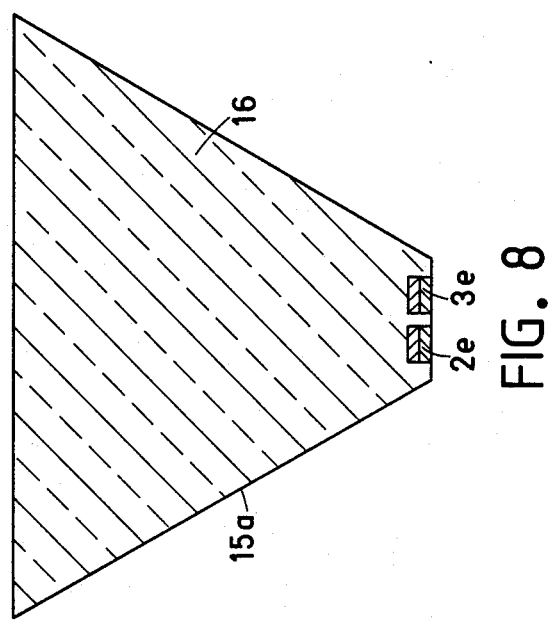
FIG. 8 is an enlarged cross-sectional view of one display segment in FIG. 7, taken along the line 8—8.

In FIG. 8, red LED 2e and green LED 3e are placed on the base of the segment body 15a, which is filled with transparent light scattering material 16. When forwardly biased, the LEDs 2e and 3e emit light signals of red and green colors, respectively, which are scattered within the transparent material 16, thereby blending the red and green light signals into a composite light signal that emerges at the upper surface of the segment body 15a. The color of the composite light signal may be controlled by varying portions of the red and green light signals.

Figure 9:
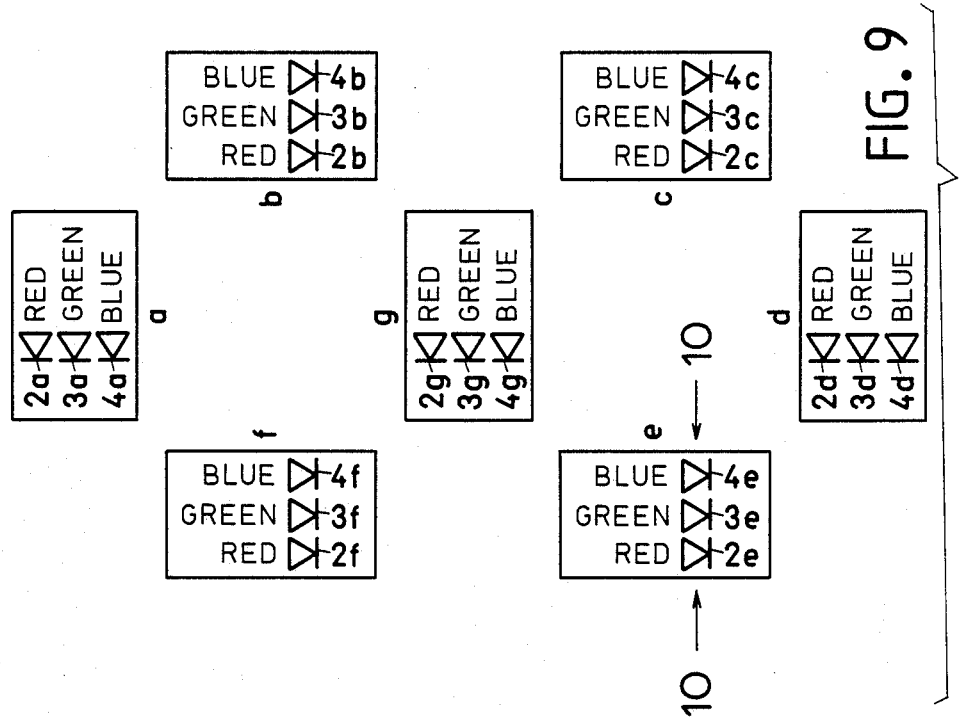
FIG. 9 is an enlarged detail of one digit of 3-primary color digital display.

In FIG. 9, each display segment of the 3-primary color display element includes a triad of LEDs: a red LED 2, green LED 3, and blue LED 4, which are closely adjacent such that the light signals emitted therefrom are substantially superimposed upon one another to mix the colors.

Figure 10:
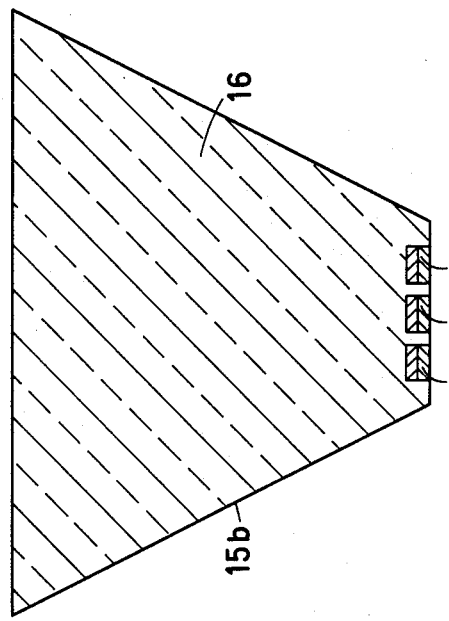
FIG. 10 is an enlarged cross-sectional view of one display segment in FIG. 9, taken along the line 10—10.

In FIG. 10, red LED 2e, green LED 3e, and blue LED 4e are placed on the base of the segment body 15b, which is filled with transparent light scattering material 16. Red LEDs are typically manufactured by diffusing a p-n junction into a GaAsP epitaxial layer on a GaAs substrate; green LEDs typically use of GaP epitaxial layer on a GaP substrate; blue LEDs are typically made from SiC material.

When forwardly biased, the LEDs 2e, 3e, and 4e emit light signals of red, green, and blue colors, respectively, which are scattered within the transparent material 16, thereby blending the red, green and blue light signals into a composite light signal that emerges at the upper surface of the segment body 15b. The color of the composite light signal may be controlled by varying the portions of the red, green, and blue light signals.

Figure 11:
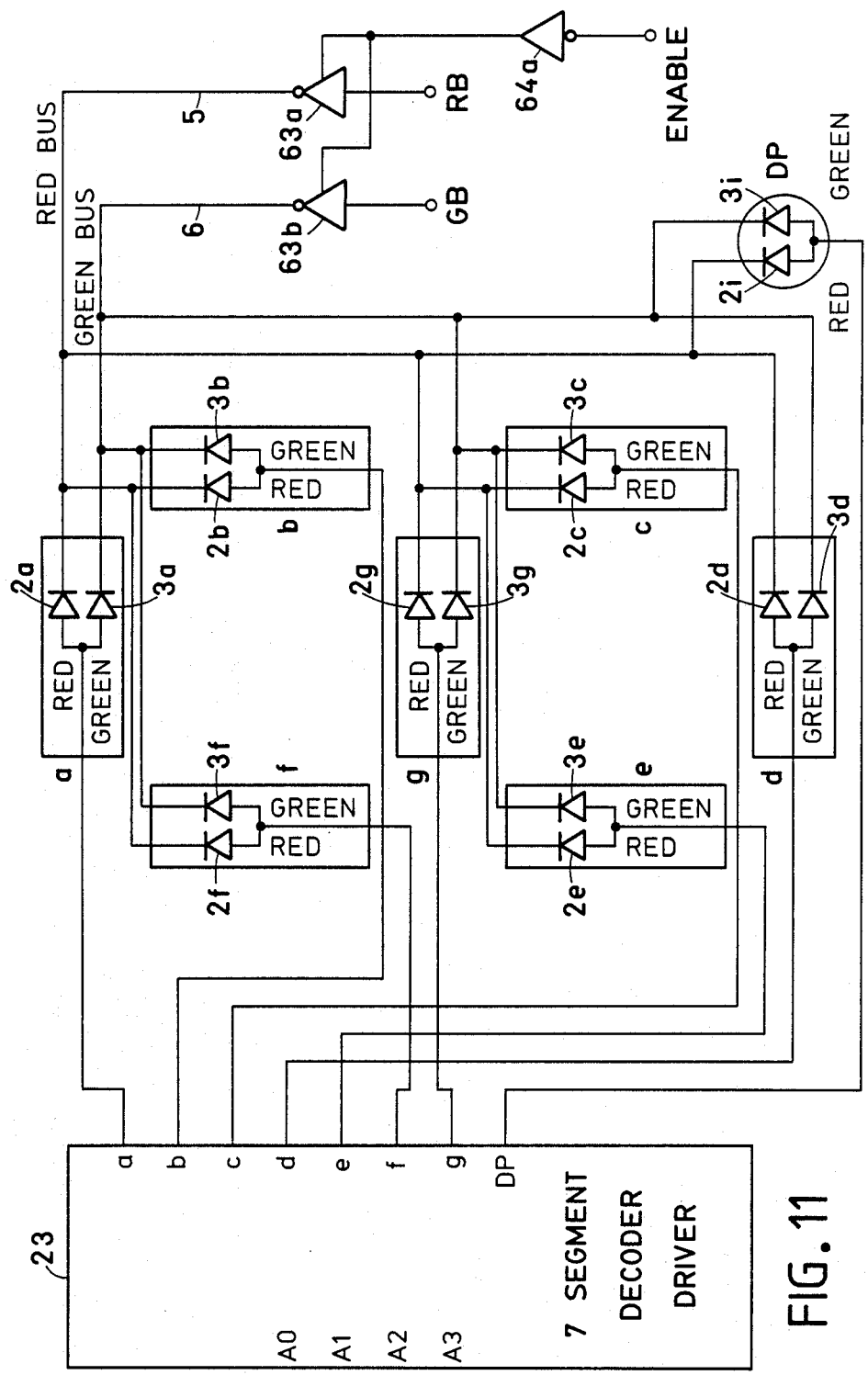
FIG. 11 is a schematic diagram of one digit of 2-primary color control circuit of this invention.

In FIG. 11 is shown a complete schematic diagram of a one-character 2-primary color common cathodes 7-segment display element which can selectively display various digital fonts in different colors. The anodes of all red and green LED pairs are interconnected in each display segment and are electrically connected to respective outputs of a commercially well known common-cathode 7-segment decoder driver 23. The cathodes of all red LEDs 2a, 2b, 2c, 2d, 2e, 2f, 2g, and 2i are interconnected to a common electric path referred to as a red bus 5. The cathodes of all green LEDs 3a, 3b, 3c, 3d, 3e, 3f, 3g, and 3i are interconnected to a like common electric path referred to as a green bus 6.

The red bus 5 is connected to the output of a tri-state inverting buffer 63a, capable of sinking sufficient current to forwardly bias all red LEDs in the display. The green bus 6 is connected to the output of a like buffer 63b. The two buffers 63a and 63b can be simultaneously enabled by applying a logic low level signal to the input of the inverter 64a, and disabled by applying a logic high level signal therein. When the buffers 63a and 63b are enabled, the conditions of the red and green buses can be selectively controlled by applying suitable logic control signals to the bus control inputs RB (red bus) and GB (green bus), to illuminate the display in a selected color. When the buffers 63a and 63b are disabled, both red and green buses are effectively disconnected, and the display is completely extinguished.

Figure 12:
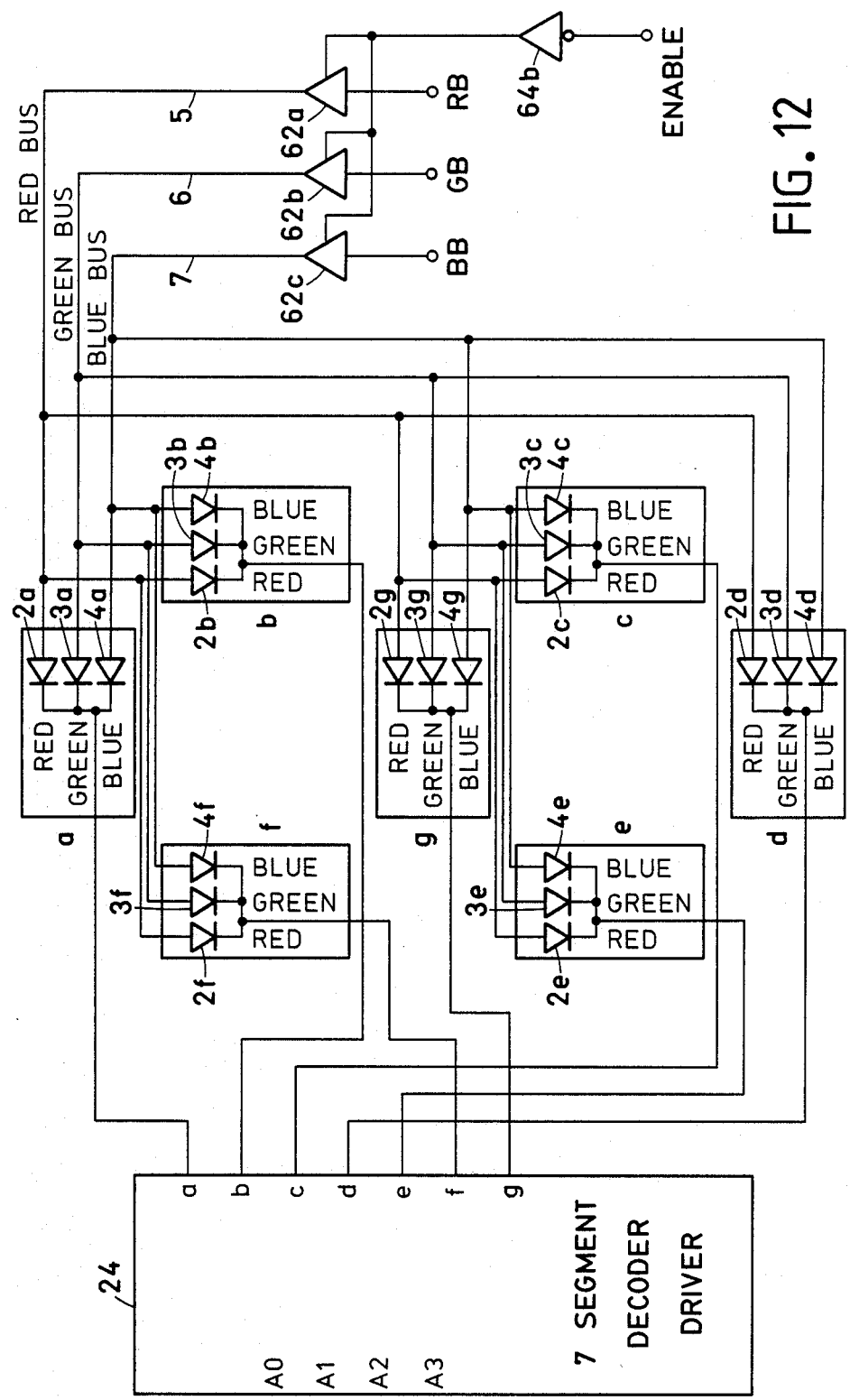
FIG. 12 is a schematic diagram of one digit of 3-primary color control circuit of this invention.

In FIG. 12 is shown a complete schematic diagram of a one-character 3-primary color common anodes 7-segment display element which can selectively display digital fonts in different colors. The cathodes of all red, green, and blue LED triads in each display segment are interconnected and electrically connected to respective outputs of a commercially well known common anode 7-segment decoder driver 24. The anodes of all red LEDs 2a, 2b, 2c, 2d, 2e, 2f and 2g are interconnected to form a common electric path referred to as a red bus 5. The anodes of all green LEDs 3a, 3b, 3c, 3d, 3e, 3f and 3g are interconnected to form a like common electric path referred to as a green bus 6. The anodes of all blue LEDs 4a, 4b, 4c, 4d, 4e, 4f and 4g are interconnected to form a like common electric path referred to as a blue bus 7.

The red bus 5 is connected to the output of a non-inverting tri-state buffer 62a, capable of sourcing sufficient current to illuminate all red LEDs in the display. The green bus 6 is connected to the output of a like buffer 62b. The blue bus 7 is connected to the output of a like buffer 62c. The three buffers 62a, 62b, 62c can be simultaneously enabled, by applying a logic low level signal to the input of the inverter 64b, and disabled by applying a logic high level signal therein. When the buffers 62a, 62b, and 62c are enabled, the conditions of the red, green, and blue buses can be selectively controlled by applying valid combinations of logic level signals to the bus control inputs RB (red bus), GB (green bus), and BB (blue bus), to illuminate the display in a selected color. When the buffers 62a, 62b and 62c are disabled, all three buses are effectively disconnected, and the display is completely extinguished.

STEP VARIABLE COLOR CONTROL

Figure 13:
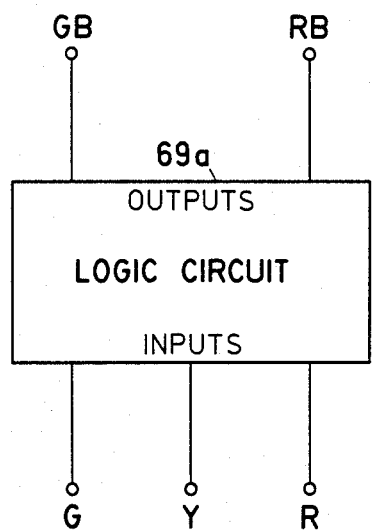
FIG. 13 is a block diagram of a color control logic circuit for controlling 2-primary color display.

In FIG. 13 is shown a logic circuit 69a for developing drive signals for the red bus 5 and green bus 6, to control the color of the display element 42 shown in FIG. 11. Two voltage levels, referred to as logic high and low, respectively, are used throughout the description of the digital circuits. The color of the display 42 may be controlled by applying valid combinations of logic level signals to its color control inputs R (Red), Y (Yellow), and G (Green). The logic circuit 69a combines the input signals in a logic fashion and develops output drive signals RB (Red Bus) and GB (Green Bus), for activating the red bus 5 and green bus 6, respectively, of the display 42.

Figure 14:
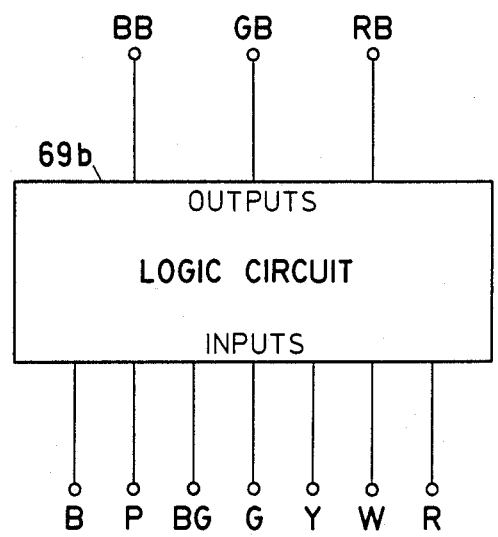
FIG. 14 is a block diagram of a color control logic circuit for controlling 3-primary color display.

In FIG. 14 is shown a like logic circuit 69b for developing drive signals for the red bus 5, green bus 6, and blue bus 7, to control the color of the display element 43 shown in FIG. 12. The color of the display 43 may be controlled by applying valid combinations of logic level signals to its color control inputs B (Blue), P (Purple), BG (Blue-Green), G (Green), Y (Yellow), W (White), and R (Red). The logic circuit 69b combines the input signals in a logic fashion and develops output drive signals RB (Red Bus), GB (Green Bus), and BB (Blue Bus), for activating the red bus 5, green bus 6, and blue bus 7, respectively, of the display 43.

Figure 15:
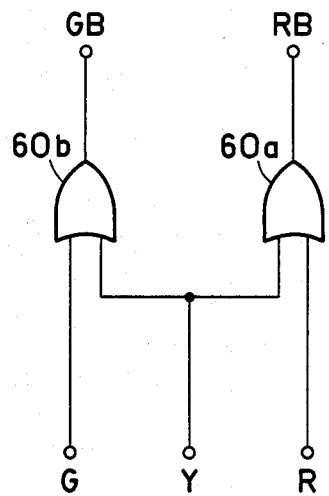
FIG. 15 is a schematic diagram of a color control logic circuit for controlling 2-primary color display.
Figure 16:
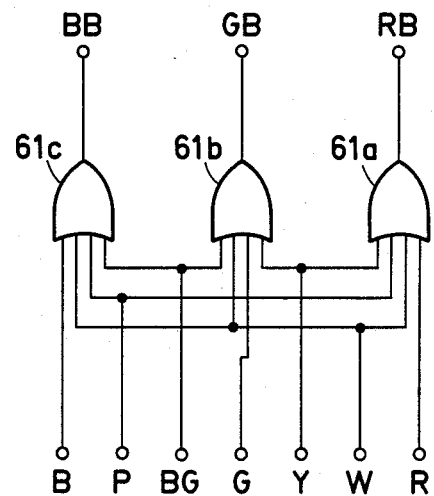
FIG. 16 is a schematic diagram of a color control logic circuit for controlling 3-primary color display.

Exemplary schematic diagrams of the color control logic circuits shown in FIGS. 15 and 16 consider active high logic levels, which means that only the selected color control input is maintained at a high logic level, while all remaining color control inputs are maintained at a low logic level. The circuit in FIG. 15 is a detail of the color control logic circuit 69a employing 2-input logic OR gates 60a and 60b, interposed between the color control inputs R, Y and G and bus control outputs RB and GB, in a manner which will become more apparent from the description below. A like circuit in FIG. 16 is a detail of the color control logic circuit 69b employing 4-input logic OR gates 61a, 61b and 61c similarly interposed between the color control inputs B, P, GB, G, Y, W and R and bus control outputs RB, GB and BB. It will be obvious to those skilled in the art that other types of logic devices may be effectively used.

Figure 17:
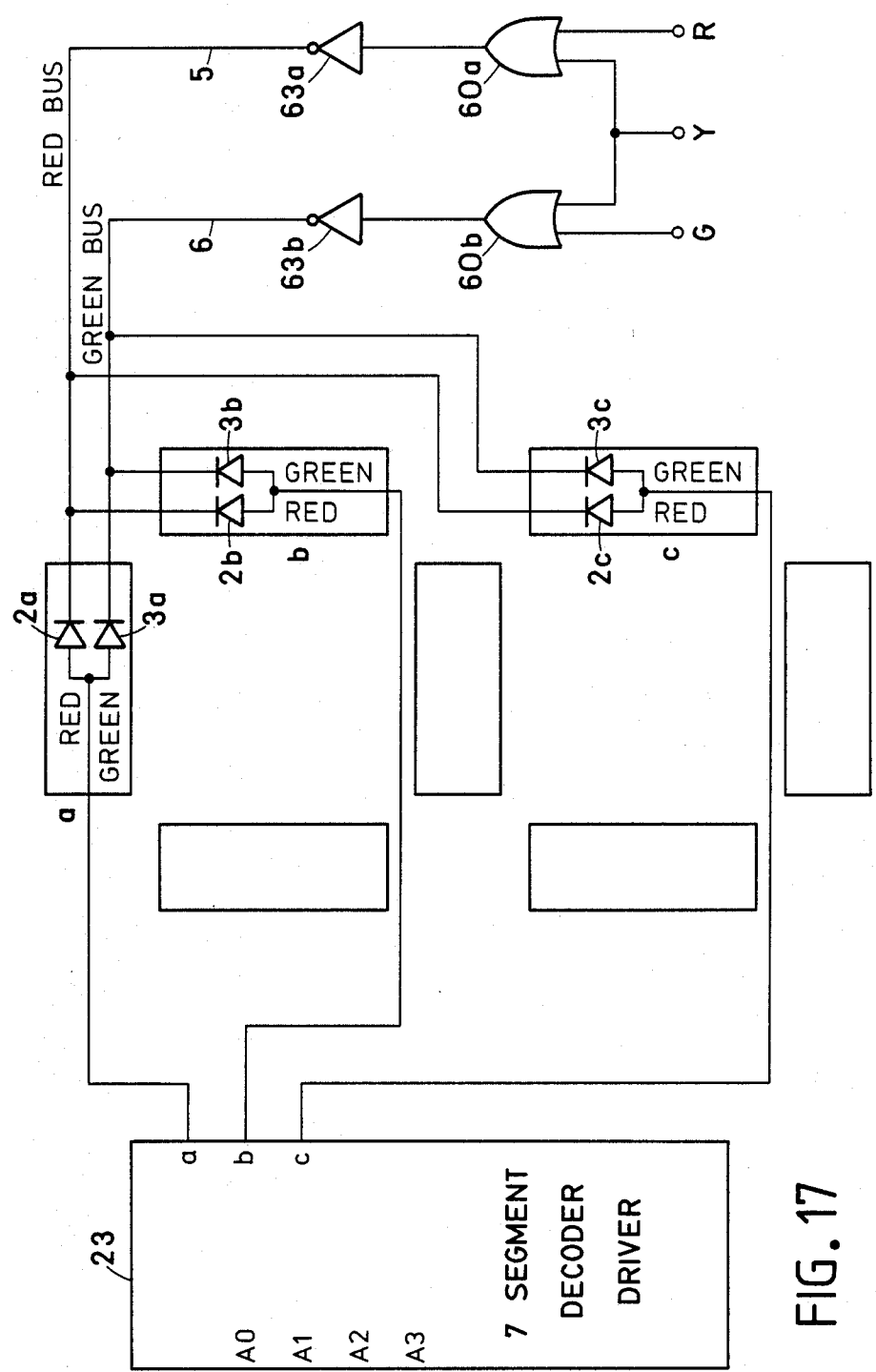
FIG. 17 is a simplified schematic diagram, similar to FIG. 11, showing how the number '7' can be displayed in three different colors.

The operation of the 2-primary color 7-segment display will be now explained on example of illuminating the digit '7' in three different colors. A simplified schematic diagram to facilitate the explanation is shown in FIG. 17. Any digit between 0 and 9 can be selectively displayed by applying the appropriate BCD code to the inputs A0, A1, A2 and A3 of the common-cathode 7-segment decoder driver 23. The decoder 23 develops at its outputs a, b, c, d, e, f, g, and DP, the drive signals for energizing selected groups of the segments to thereby visually display the selected number, in a manner well known to those having ordinary skill in the art. To display decimal number '7', a BCD code 0111 is applied to the inputs A0, A1, A2, and A3. The decoder 23 develops high voltage levels at its outputs a, b, and c, to illuminate equally designated segments, and low voltage levels at all remaining outputs (not shown), to extinguish all remaining segments.

To illuminate the display in red color, the color control input R is raised to a high logic level, and the color control inputs Y and G are maintained at a low logic level. As a result, the output of the OR gate 60a rises to a high logic level, thereby causing the output of the buffer 63a to drop to a low logic level. The current flows from the output a of the decoder 23, via red LED 2a and red bus 5, to the current sinking output of the buffer 63a. Similarly, the current flows from the output b of the decoder 23, via red LED 2b and red bus 5, to the output of the buffer 63a. The current from the output c of the decoder 23 flows via red LED 2c and red bus 5, to the output of the buffer 63a. As a result, the segments a, b and c illuminate in red color, thereby causing a visual impression of a character '7'. The green LEDs 3a, 3b and 3c remain extinguished because the output of the buffer 63b is at a high logic level, thereby disabling the green bus 6.

To illuminate the display in green color, the color control input G is raised to a high logic level, while the color control inputs R and Y are maintained at a low logic level. As a result, the output of the OR gate 60b rises to a high logic level, thereby causing the output of the buffer 63b to drop to a low logic level. The current flows from the output a of the decoder 23, via green LED 3a and green bus 6, to the current sinking output of the buffer 63b. Similarly, the current flows from the output b of the decoder 23, via green LED 3b and green bus 6, to the output of the buffer 63b. The current from the output c of the decoder 23 flows, via green LED 3c and green bus 6, to the output of the buffer 63b. As a result, the segments a, b and c illuminate in green color. The red LEDs 2a, 2b and 2c remain extinguished because the output of the buffer 63a is at a high logic level, thereby disabling the red bus 5.

To illuminate the display in yellow color, the color control input Y is raised to a high logic level, while the color inputs R and G are maintained at a low logic level. As a result, the outputs of both OR gates 61a and 61b rise to a high logic level, thereby causing the outputs of both buffers 63a and 63b to drop to a low logic level. The current flows from the output a of the decoder 23, via red LED 2a and red bus 5, to the current sinking output of the buffer 63a, and, via green LED 3a and green bus 6, to the current sinking output of the buffer 63b. Similarly, the current from the output b of the decoder 23 flows, via red LED 2b and red bus 5, to the output of the buffer 63a, and, via green LED 3b and green bus 6, to the output of the buffer 63b. The current from the output c of the decoder 23 flows, via red LED 2c and red bus 5, to the output of the buffer 63a, and, via green LEd 3c and green bus 6, to the output of the buffer 63b. As a result of blending light of red and green color in each segment, the segments a, b and c illuminate in substantially yellow color.

Figure 18:
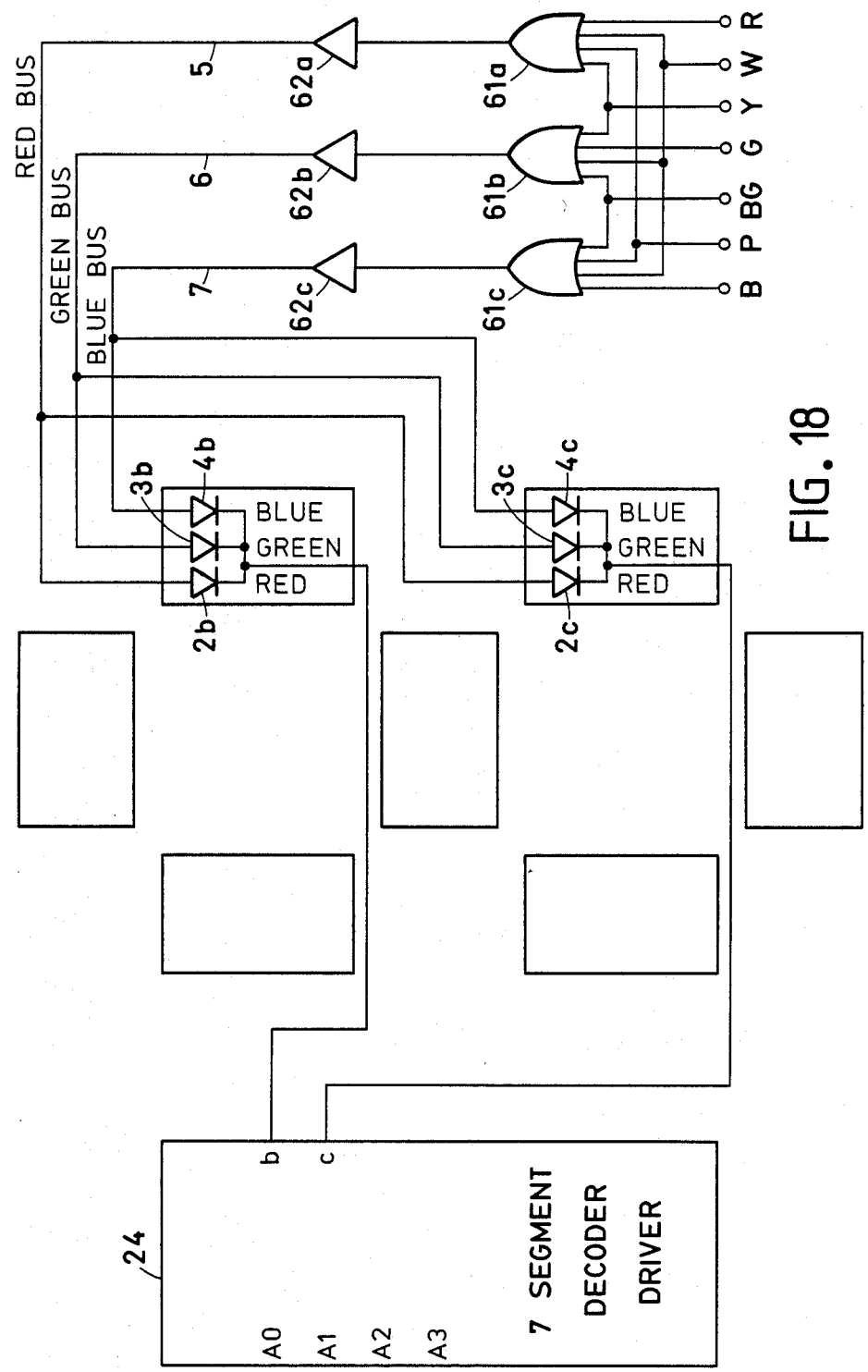
FIG. 18 is a simplified schematic diagram, similar to FIG. 12, showing how the number '1' can be displayed in seven different colors.

The operation of the 3-primary color 7-segment display shown in FIG. 12 will be now explained on example of illuminating the digit '1' in seven different colors. A simplified schematic diagram to facilitate the explanation is shown in FIG. 18. To display decimal number '1', a BCD code 0001 is applied to the inputs A0, A1, A2 and A3 of the common anode 7-segment decoder driver 24. The decoder 24 develops low voltage levels at its outputs band c, to illuminate equally designated segments and high voltage levels at all remaining outputs (not shown), to extinguish all remaining segments.

To illuminate the display in red color, the color control input R is raised to a high logic level, while all remaining color control inputs are maintained at a low logic level. As a result, the output of the OR gate 61a rises to a high logic level, thereby causing the output of the buffer 62a to rise to a high logic level. The current flows from the output of the buffer 62a, via red bus 5 and red LED 2b, to the output b of the decoder 24, and, via red LED 2c, to the output c of the decoder 24. As a result, the segments b and c illuminate in red color, thereby causing a visual impression of a character '1'. The green LEDs 3b, 3c and blue LEDs 4b, 4c remain extinguished because the green bus 6 and blue bus 7 are disabled.

To illuminate the display in green color, the color control input G is raised to a high logic level, while all remaining color control inputs are maintained at a low logic level. As a result, the output of the OR gate 61b rises to a high logic level, thereby causing the output of the buffer 62b to rise to a high logic level. The current flows from the output of the buffer 62b, via green bus 6 and green LED 3b, to the output b of the decoder 24, and, via green LED 3c, to the output c of the decoder 24. As a result, the segments b and c illuminate in green color.

To illuminate the display in blue color, the color control input B is raised to a high logic level, while all remaining color control inputs are maintained at a low logic level. As a result, the output of the OR gate 61c rises to a high logic level, thereby causing the output of the buffer 62c to rise to a high logic level. The current flows from the output of the buffer 62c, via blue bus 7 and blue LED 4b, to the output b of the decoder 24, and, via blue LED 4c, to the output c of the decoder 24. As a result, the segments b and c illuminate in blue color.

To illuminate the display in yellow color, the color control input Y is raised to a high logic level, while all remaining color control inputs are maintained at a low logic level. As a result, the outputs of the OR gates 61a and 61b rise to a high logic level, thereby causing the outputs of the buffers 62a and 62b to rise to a high logic level. The current flows from the output of the buffer 62a, via red bus 5 and red LED 2b, to the output b of the decoder 24, and, via red LED 2c, to the output c of the decoder 24. The current also flows from the output of the buffer 62b, via green bus 6 and green LED 3b, to the output b of the decoder 24, and, via green LED 3c, to the output c of the decoder 24. As a result of blending light of red and green colors in each segment, the segments b and c illuminate in substantially yellow color.

To illuminate the display in purple color, the color control input P is raised to a high logic level, while all remaining color control inputs are maintained at a low logic level. As a result, the outputs of the OR gates 61a and 61c rise to a high logic level, thereby causing the outputs of the buffers 62a and 62c to rise to a high logic level. The current flows from the output of the buffer 62a, via red bus 5 and red LED 2b, to the output b of the decoder 24, and, via red LED 2c, to the output c of the decoder 24. The current also flows from the output of the buffer 62c, via blue bus 7 and blue LED 4b, to the output b of the decoder 24, and, via blue LED 4c, to the output c of the decoder 24. As a result of blending light of red and blue color in each segment, the segments b and c illuminate in substantially purple color.

To illuminate the display in blue-green color, the color control input BG is raised to a high logic level, while all remaining color control inputs are maintained at a low logic level. As a result, the outputs of the OR gates 61*b* and 61*c* rise to a high logic level, thereby causing the outputs of the buffers 62*b* and 62*c* to rise to a high logic level. The current flows from the output of the buffer 61*b*, via green bus 6 and green LED 3*b*, to the output b of the decoder 24, and, via green LED 3*c*, to the output c of the decoder 24. The current also flows from the output of the decoder 62*c*, via blue bus 7, blue LED 4*b*, to the output b of the decoder 24, and, via blue LED 4*c*, to the output c of the decoder 24. As a result of blending light of green and blue colors in each segment, the segments b and c illuminate in substantially blue-green color.

To illuminate the display in white color, the color control input W is raised to a high logic level, while all remaining color control inputs are maintained at a low logic level. As a result, the outputs of the OR gates 61*a*, 61*b* and 61*c* rise to a high logic level, thereby causing the outputs of the respective buffers 62*a*, 62*b*, and 62*c* to rise to a high logic level. The current flows from the output of the buffer 62*a*, via red bus 5 and red LED 2*b*, to the output b of the decoder 24, and, via red LED 2*c*, to the output c of the decoder 24. The current also flows from the output of the buffer 62*b*, via green bus 6 and green LED 3*b*, to the output b of the decoder 24, and, via green LED 3*c*, to the output c of the decoder 24. The current also flows from the output of the buffer 62*c*, via blue bus 7 and blue LED 4*b*, to the output b of the decoder 24, and, via blue LED 4*c*, to the output c of the decoder 24. As a result of blending light of red, green, and blue colors in each segment, the segments b and c illuminate in substantially white color.

Since the outputs of the 7-segment decoder 24 may be overloaded by driving a triad of LEDs in parallel in the display 43, rather than a single LED in a monochromatic display, it would be obvious to employ suitable buffers to drive respective color display segments (not shown).

TELEPHONE

Figure 19:
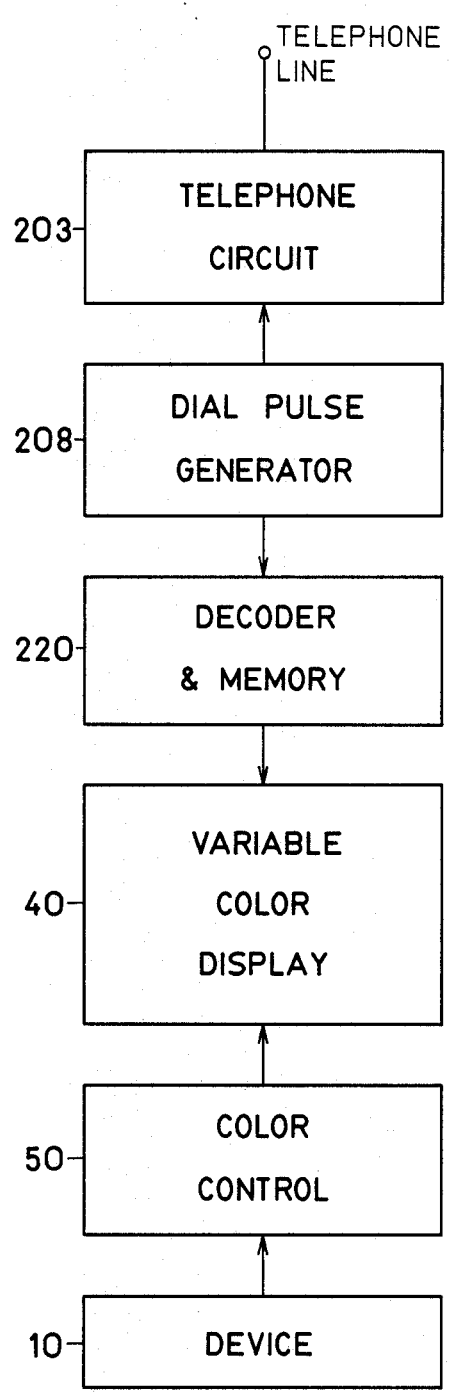
FIG. 19 is a block diagram of a dial pulse telephone with variable color display with external color control.

Turning now to FIG. 19, variable color display telephone of this invention includes a telephone circuit 203, suitably connected to a telephone line, and dial pulse generator 208 for producing a series of dial pulses which are transmitted to the Central Office and used to route the telephone call, in a manner well known to those skilled in the art. A decoder and memory circuit 220 converts the dialed pulses to displayable code, and variable color display 40 visually presents digits corresponding to the number of dialed pulses. The invention resides in the addition of a color control 50 for controlling color of the display in accordance with output electrical signals developed by an external device 10.

Figure 20:
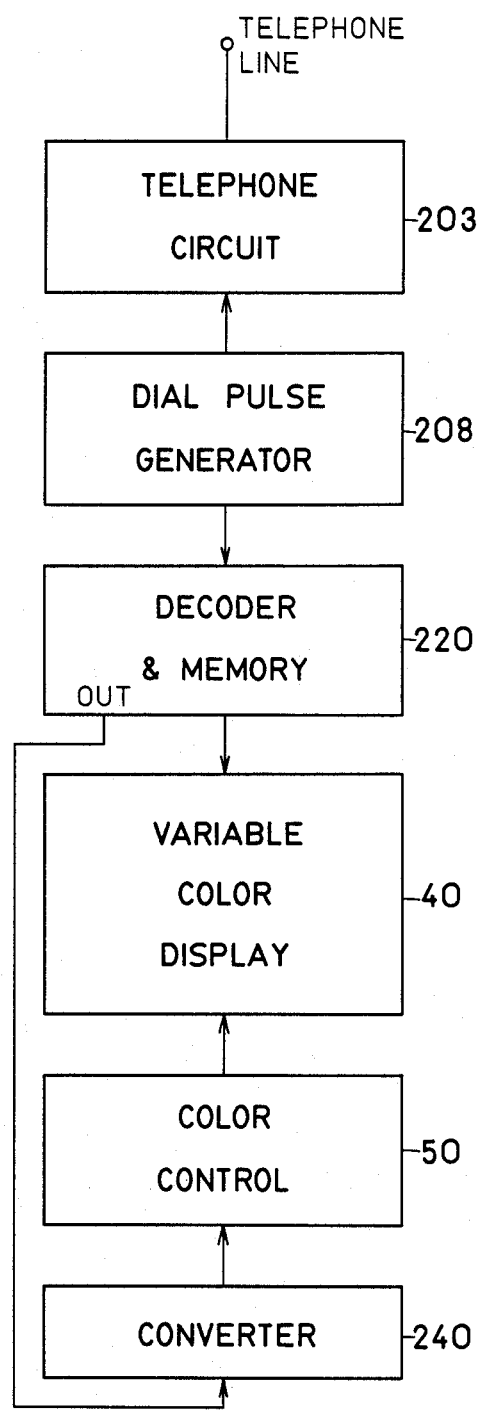
FIG. 20 is a block diagram of a dial pulse telephone with variable color display with internal color control.

A similar variable color display telephone, shown in FIG. 20, differs in that color of the telephone display is controlled internally, as will be more fully discussed later.

Figure 21:
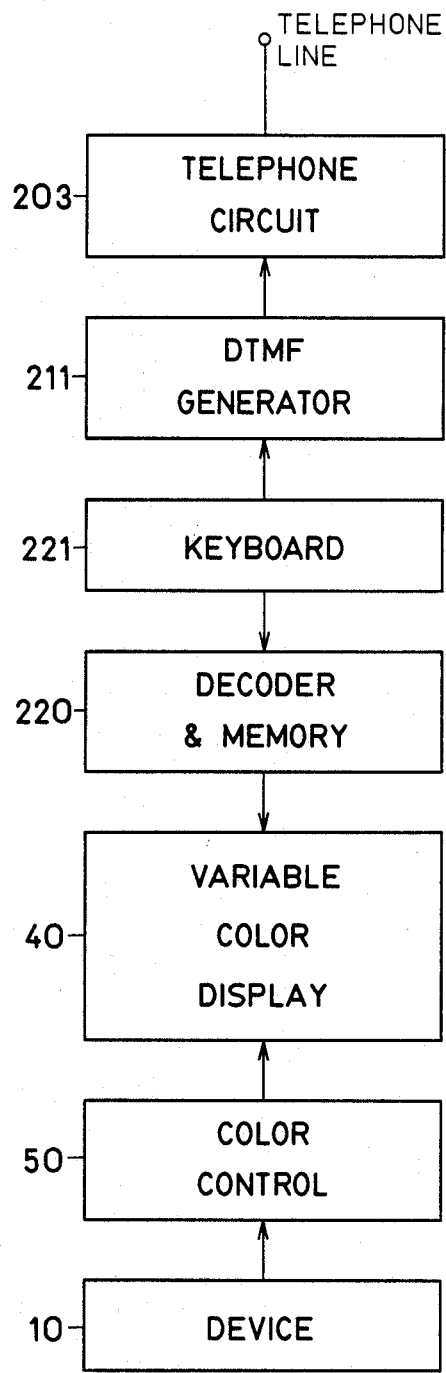
FIG. 21 is a block diagram of a DTMF telephone with variable color display with external color control.

Another embodiment of a variable color display telephone of this invention, shown in FIG. 21, includes a DTMF (Dual-Tone Multi-Frequency) generator 211 for developing pairs of tones unique to a dialed character in response to actuation of a keyboard 221. The decoder and memory circuit 220 converts the keyboard output code to displayable code, and variable color display 40 visually presents the dialed digits.

Figure 22:
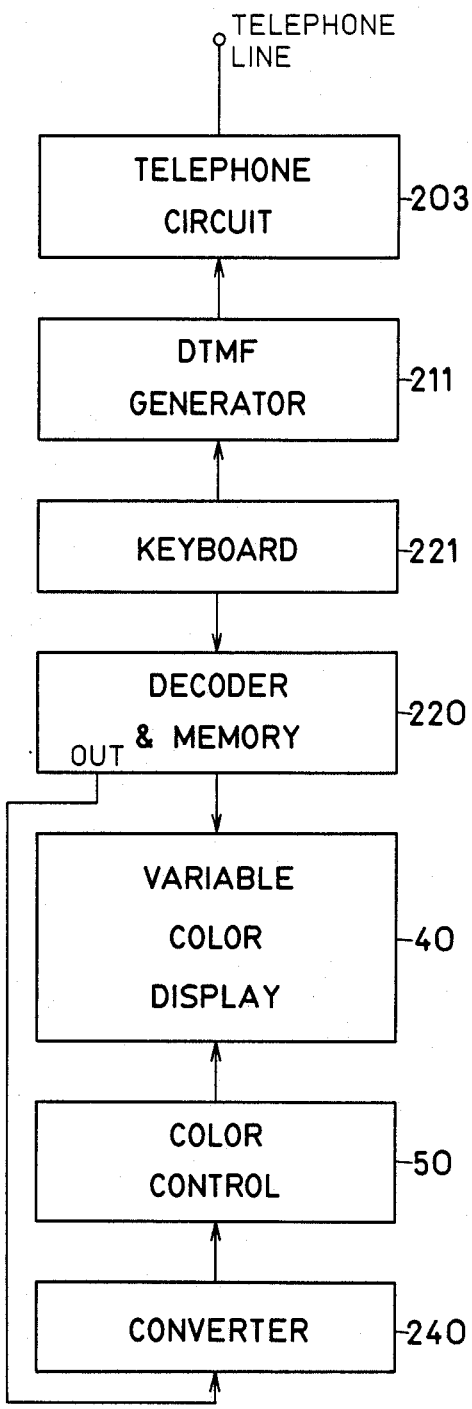
FIG. 22 is a block diagram of a DTMF telephone with variable color display with internal color control.

A similar variable color display telephone, illustrated in FIG. 22, differs in that color control signals are developed internally, as will be more fully revealed subsequently.

It is contemplated that the present invention is applicable to any type of a telephone device, either stationary or mobile, equipped either with a multi-frequency or pulse-dialing capability (either true or simulated one), used either in a space division or time division telephone system, and to a device for use in conjunction with a telephone, such as telephone answering system, automatic dialing system, and the like. It is further contemplated that the principles of the invention may be also applied to data exchange between telephone systems.

The term "dialing" as used throughout the description of the invention is used in its widest sense so as to include rotary dialing, keying on a telephone keyboard or keypad, using abbreviated codes, automatic dialing, and the like.

Figure 23:
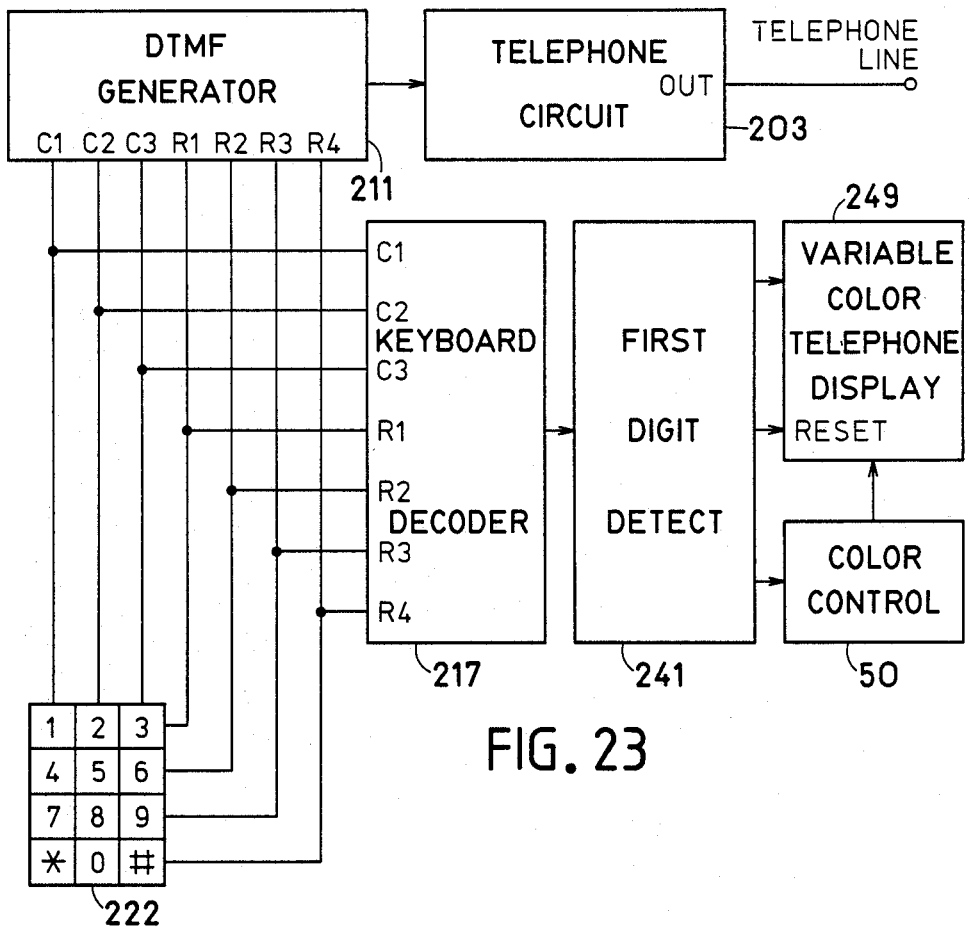
FIG. 23 is a block diagram of a telephone for displaying dialed telephone number in variable color.

A variable color display telephone shown in FIG. 23 includes a telephone keyboard or keypad 222 having its outputs applied to a DTMF generator 211, for generating DTMF tones unique to the actuated key, and a telephone circuit 203 interfacing the DTMF generator to a telephone line, in a manner well understood by those skilled in the art. The invention resides in the addition of a keyboard decoder 217, for converting output electrical signals of the keyboard 222 to a suitable code, first digit detect circuit 241, for interrogating the first dialed digit to determine the type of a call, variable color telephone display 249, for visually presenting dialed digits, and color control circuit 50, for illuminating the telephone display in a color in accordance with output signals of the first digit detect circuit. The telephone display thus visually presents dialed telephone numbers in a color depending on the type of the call, e.g., internal, external, local, long distance, and the like.

Figure 24:
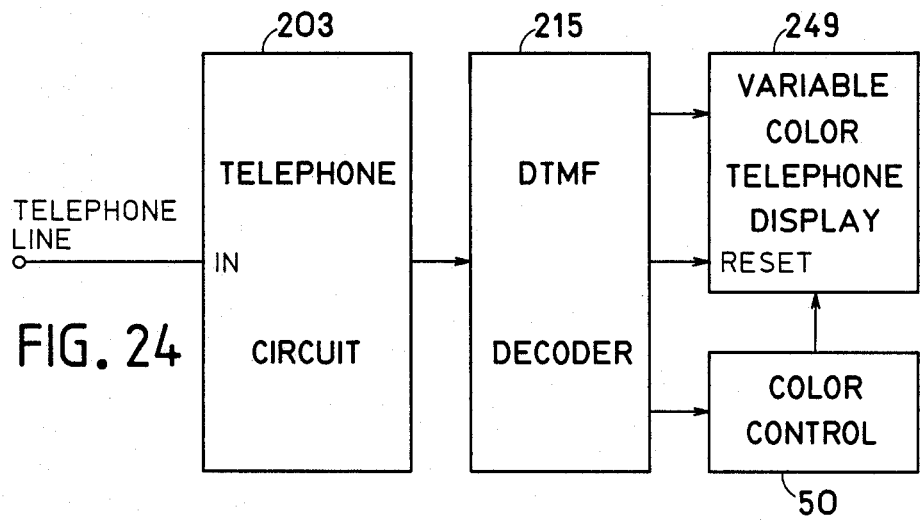
FIG. 24 is a block diagram of a telephone for displaying received telephone number in variable color.

In another embodiment of the invention, variable color display telephone in FIG. 24 includes a telephone circuit 203 for receiving valid DTMF signals (corresponding to dialed characters) that appear on a telephone line, DTMF decoder 215 for converting the signals to suitable codes, variable color telephone display 249 for displaying the received characters, and color control 50 for illuminating the telephone display in a selected color.

Figure 25:
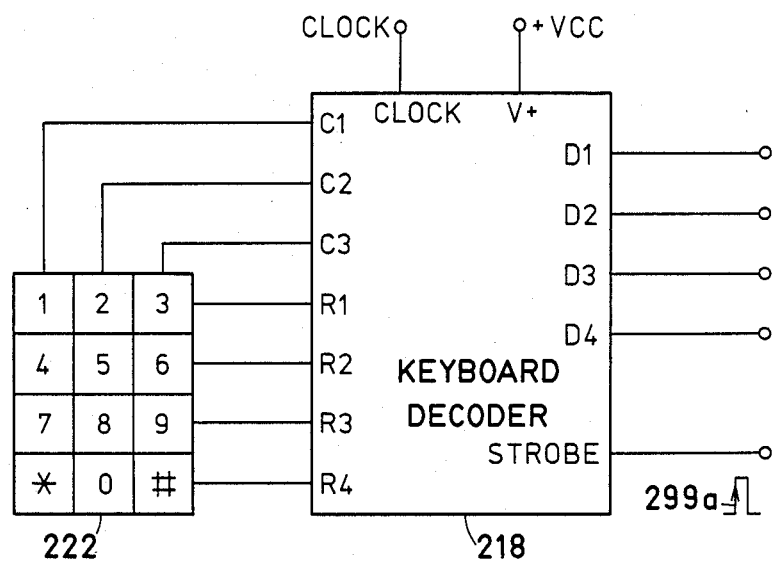
FIG. 25 is a schematic diagram of a keyboard decoder.

In FIG. 25 is shown a schematic diagram of a telephone keyboard decoder which includes a keyboard decoder chip 218 having four row inputs R1, R2, R3 and R4 and three column inputs C1, C2 and C3 connected to twelve keyswitches, arranged preferably in four rows and three columns, of a keyboard 222. A periodic sequence of clock pulses of a suitable frequency is applied to the CLOCK input. When a single key of the keyboard is actuated, the decoder develops at its outputs D1, D2, D3 and D4 binary code unique to the actuated key. A positive going strobe pulse 299*a* of a short duration is produced at the STROBE output when the key was actuated for at least a predetermined time, to indicate that the output code is valid. The output binary code and strobe are used in the present invention, as will become more apparent later.

Figure 26:
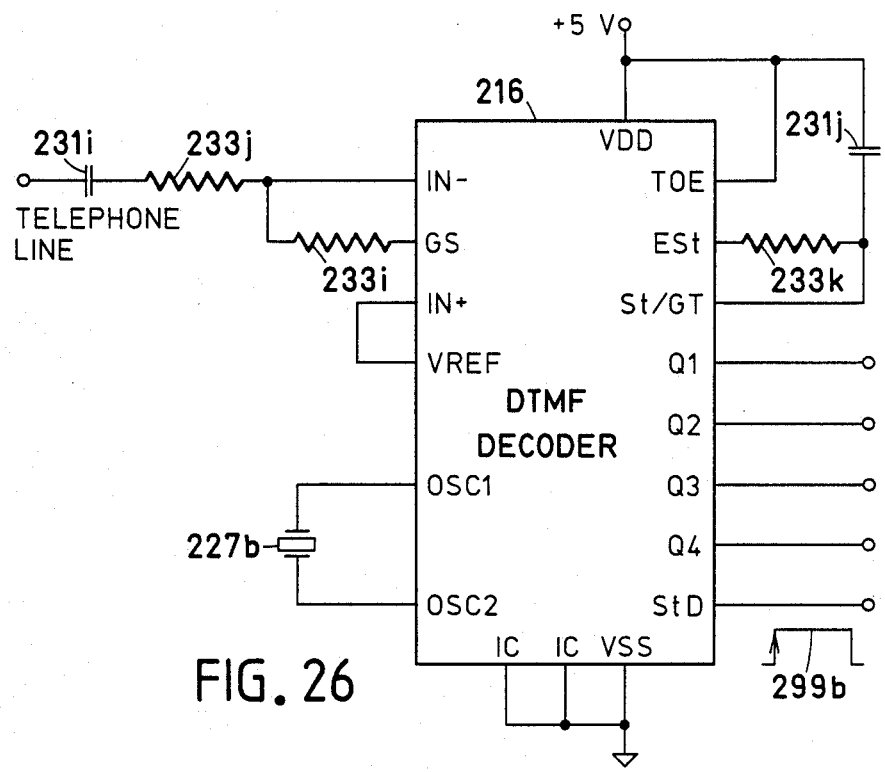
FIG. 26 is a schematic diagram of a DTMF receiver and decoder.

In a schematic diagram shown in FIG. 26, a DTMF decoder chip 216 has its input IN- operatively connected, via a capacitor 231*i* and resistor 233*j* of suitable values, to a telephone line. When valid DTMF signals appear on the telephone line, the decoder internally determines the frequencies of the detected tones and developes at its outputs Q1, Q2, Q3, and Q4 a binary code unique to the detected DTMF signals. If the durations of the tones are valid, a short positive going strobe pulse 299b is produced at the Delayed Steering output StD, to indicate that the signal has been successfully decoded. The output binary code and strobe are used in the present invention, as will be more fully explained below.

Figure 27:
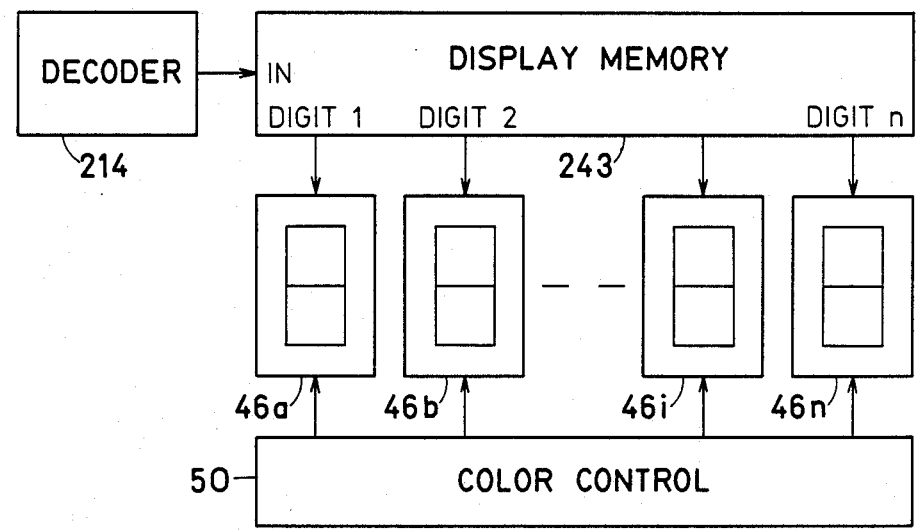
FIG. 27 is an expanded block diagram of a variable color telephone display.

In an expanded block diagram of a variable color telephone display shown in FIG. 27, a decoder 214, which may have characteristics of a keyboard decoder, shown in FIG. 25, a DTMF decoder, shown in FIG. 26, and the like, develops output binary codes, corresponding to dialed characters or to received DTMF signals, which are stored in a display memory 243. The outputs of the display memory are applied to respective display elements 46a to 46n for indicating the dialed characters or DTMF signals in a sequence as they appear at the decoder's outputs. The color of the display elements may be controlled, either uniformly or individually, by color control 50.

Figure 28:
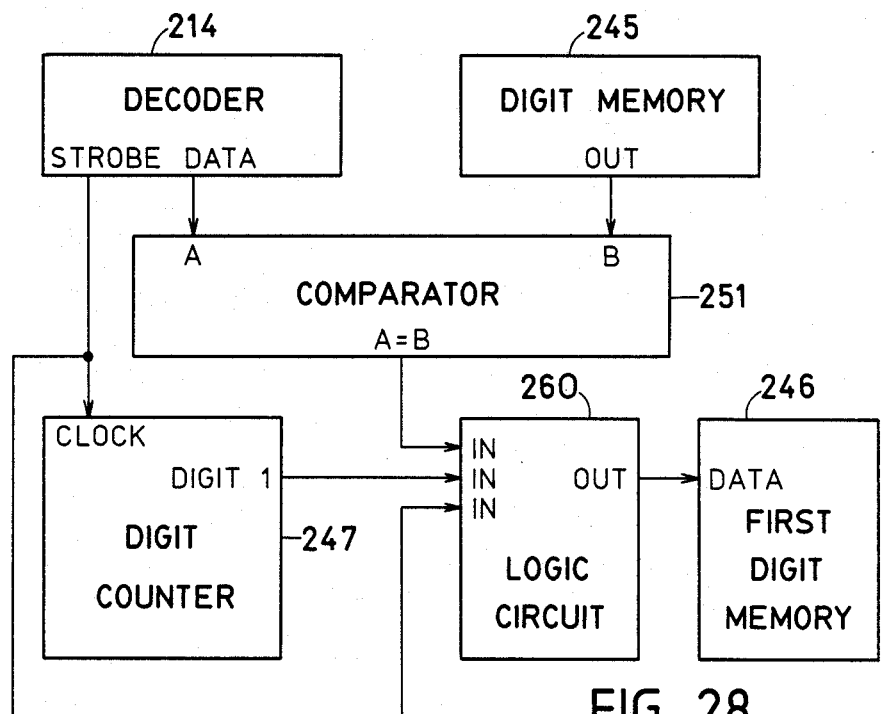
FIG. 28 is an expanded block diagram of a first dialed digit detect circuit.

Telephone set in a business environment, usually connected to a local exchange such as a PBX (Private Branch Exchange), is capable of selectively dialing telephone numbers for establishing either internal calls within the business network or external (trunk) calls to an external Central Office. External calls are usually distinguished by firstly dialing a predetermined digit (typically "9"), followed by the telephone number of a called party. Internal calls are usually dialed directly. To better distinguish between internal and external calls, a provision is made in the present invention to automatically display dialed telephone numbers in a first color for internal calls and in a second color for external ones. To accomplish this, the circuit shown in a block diagram configuration in FIG. 28 is used to interrogate the leading dialed digit by comparing it with a predetermined reference value. In practice, the dialed digits are successively decoded by a decoder 214, counted by a digit counter 247, and compared by a comparator 251 with the reference value stored in a digit memory 245. If the first dialed digit after the telephone handset goes off-hook is equal to the reference value, a logic circuit 260, operatively connected to the output A=B of the comparator 251 and to the output DIGIT 1 of the digit counter 247, deposits into first digit memory 246 a value indicating that it is an external call. The first digit memory may be restored again to its initial condition when the telephone handset goes on-hook to terminate the call.

Figure 29:
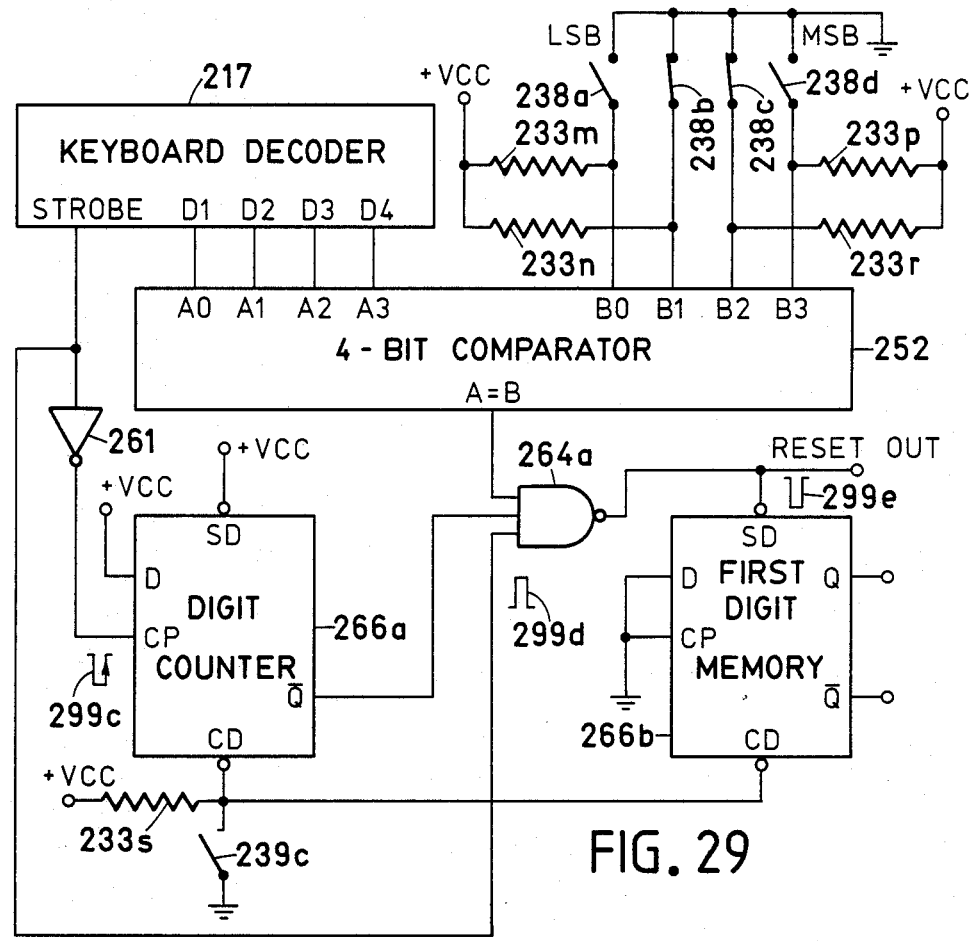
FIG. 29 is a schematic diagram of a first dialed digit detect circuit.

An important consideration has been given to the first digit detect circuit, shown in a schematic diagram in FIG. 29, in which an array of manually operated binary switches 238a to 238d is used as a memory for the reference value. In the conditions shown in the diagram, the binary switches 238a and 238d are open, to maintain the inputs B0 and B3 of the comparator 252, via pull-up resistors 233m and 233p, at a high logic level, while the binary switches 238b and 238c are closed, to force the inputs B1 and B2 to a low logic level. The resulting binary code 1001 corresponds to decimal number "9". Initially, both flip-flops 266a, and 266b are reset by having their interconnected Clear Direct inputs CD grounded via closed ON/OFF hook switch 239c while the telephone handset in on-hook; when the handset is lifted, the switch 239c opens, thereby driving the CD inputs to a high logic level via pull-up resistor 233s. When the first dialed digit appears at the outputs D1, D2, D3, and D4 of keyboard decoder 217, which are directly applied to the inputs A0, A1, A2 and A3 of the comparator 252, the latter effects comparison between its A and B inputs. When the A and B inputs are not equal, the comparator's output A=B remains at a low logic level, thereby inhibiting the NAND gate 264a, and causing its output to remain at a high logic level. However, when the A and B inputs are equal, the comparator's output A=B rises to a high logic level to indicate that the first dialed digit was "9". The NAND gate 264a thus has its first to inputs high, and when the strobe 299d appears at its third input, its output drops to a low logic level to provide a pulse 299e for setting, via the Set Direct input SD, the first digit memory 266b, and for resetting the display register, as will be more fully explained later. The trailing edge of the strobe 299c sets the digit counter 266a, causing its complementary output $\overline{Q}$ to drop to a low logic level to inhibit the NAND gate 264a for the rest of the dialing sequenced. It is thus obvious that the first digit memory 266b indicates, immediately after the dialing of the first digit, the type of the call to be established: the first digit memory in its reset condition indicates an internal call and in its set condition indicates an external one.

Figure 30:
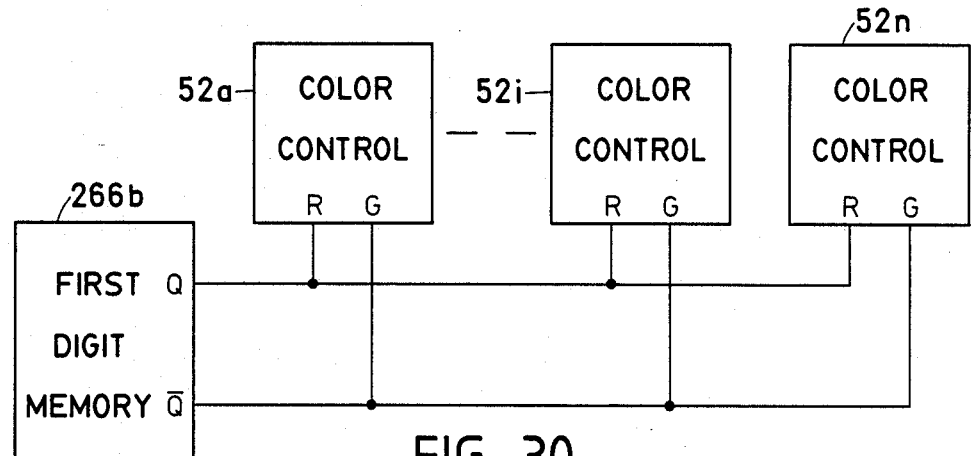
FIG. 30 is an expanded block diagram of a color control circuit responsive to the first digit detect circuit.

As shown in detail in FIG. 30, the outputs Q and $\overline{Q}$ of the first digit memory 266b are respectively applied to the interconnected color control inputs R and G of the color control circuits 52a to 52n. When the complementary output $\overline{Q}$ rises to a high logic level, indicating an internal call, the G inputs of all color control circuits are activated to cause all display digits to illuminate in green color. When the output Q rises to a high logic level, indicating an external call, the R inputs of all color control circuits are activated to cause all display digits to illuminate in red color.

Figure 31:
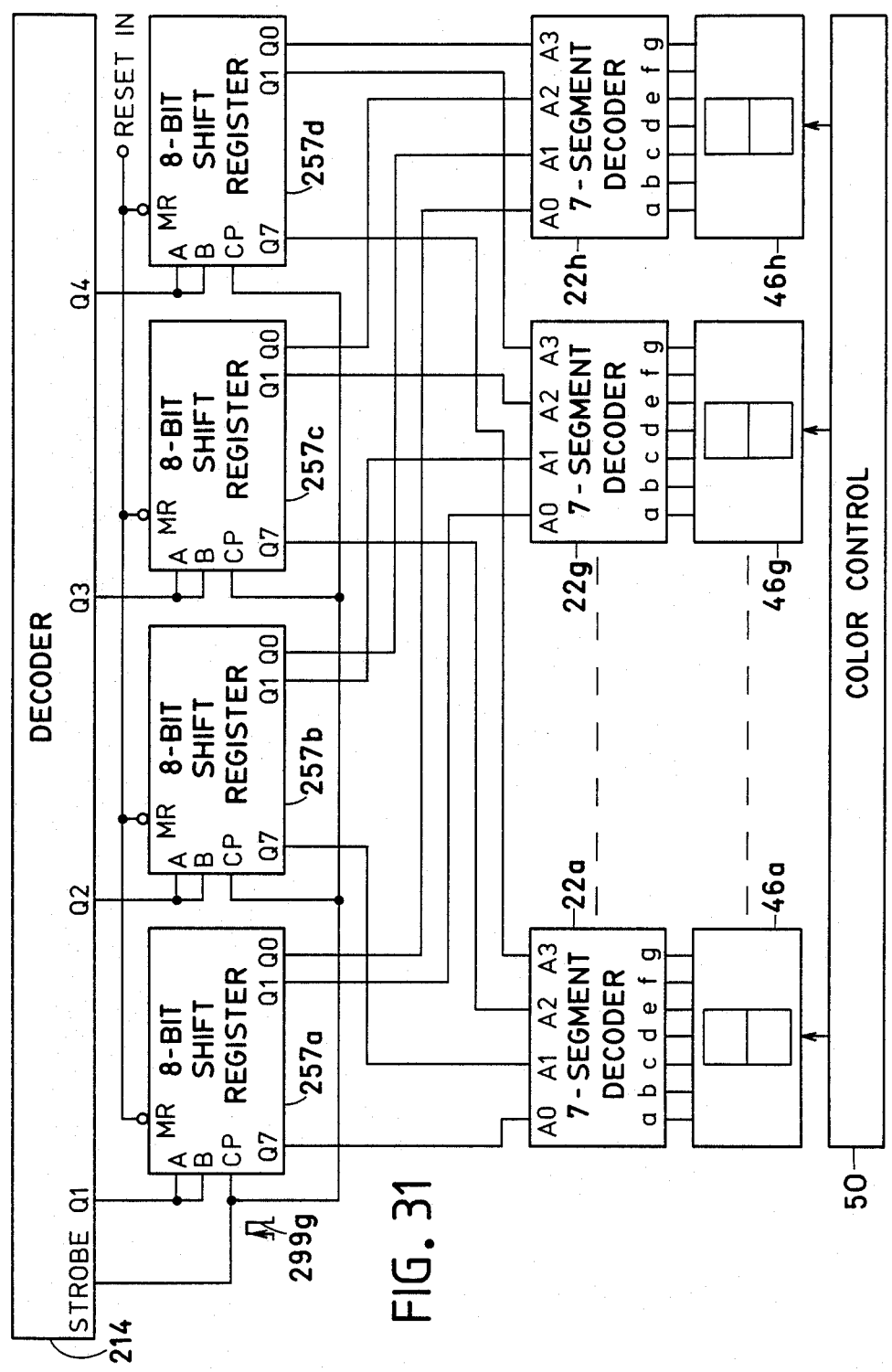
FIG. 31 is a schematic diagram of a variable color digital telephone display.

In an exemplary schematic diagram of a variable color telephone display shown in FIG. 31, the output binary data developed by the decoder 214, representing the instant dialed digit, are applied to respective data inputs of four 8-bit shift registers 257a, 257b, 257c and 257d. The rising edge of the strobe pulsse 299g, which indicates that the decoder's output data are valid, is applied to the interconnected Clock Pulse inputs CP for clocking the instant data into respective shift registers. It will be appreciated that the broken lines in the schematic diagram indicate that in reality there are eight 7-segment decoders 22 and eight associated variable color display elements 46. The outputs of the four shift registers are connected to eight 7-segment decoders 22a to 22h such that the least significant outputs of all shift registers are connected to inputs of the least significant decoder 22h, and the remaining outputs of the shift registers are progressively connected to inputs of successive decoders, ending with the most significant outputs of the shift registers being connected to inputs of the most significant decoder 22a. It is thus obvious that the first dialed digit clocked into the shift registers is displayed on the least significant display element 46h. When the second dialed digit is clocked into the shift registers, the first one is automatically shifted to the display element 46g, etc., until the entire dialed telephone number is displayed in a sequence on certain of the display elements 46a to 46h, depending on its length. The Master Reset inputs MR of all four shift registers are interconnected to the RESET IN terminal, which is directly connected to the RESET OUT output shown in FIG. 29. When the first dialed digit is not the predetermined one, indicating an internal call, there is no reset pulse at the RESET OUT output. Consequently, all dialed digits are displayed on the display elements 46a to 46h in green color, as shown in FIG. 30. When, however, the first dialed digit is the predetermined one, indicating an external call, the pulse 299e, developed at the RESET OUT output, activates the interconnected master reset inputs of the four shift registers to cause the same to be initialized. In such a case, the first dialed digit disappears from the display element 46h, and all subsequently dialed digits will be displayed on the display elements 46a to 46h in red color, as shown in FIG. 30.

Figure 32:
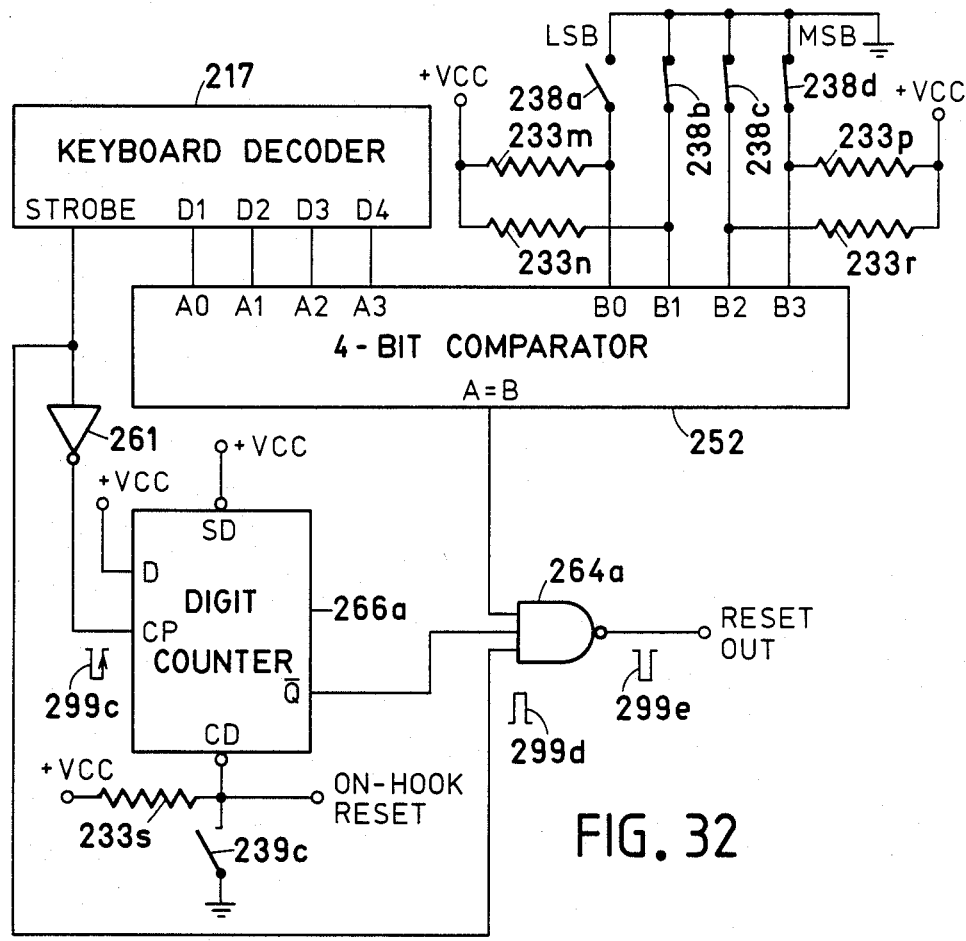
FIG. 32 is a schematic diagram of a first digit detect circuit for dialing a long distance telephone number.

In FIG. 32 is shown a schematic diagram of a first digit detect circuit modified for long distance dialing. In the preferred embodiment of the invention, a telephone system is considered in which long distance calls are initiated by dialing number "1" followed by a 3-digit area code and 7-digit local telephone number. It would be obvious to those skilled in the art that the invention may be readily applied to other telephone systems. The circuit shown in FIG. 32 differs from a like one in FIG. 29 in that first digit memory 266b is omitted, and binary switches 238a to 238d are set to present binary number 0001 (decimal 1) at the inputs B0 to B3 of the comparator 252. When the first dialed digit is not equal to "1", thereby indicating a local call, the output A=B of the comparator 252 remains at a low logic level, thereby blocking the NAND gate 264a. Consequently, there is no pulse at the output of the latter. However, when the first dialed digit is equal to "1", thereby indicating a long distance call, the output A=B of the comparator 252 rises to a high logic level. Consequently, the strobe pulse 299d causes a negative going pulse 299e to be produced at the output of the NAND gate 264a. The pulse 299e is used to reset the display register and to control the color of the telephone display, as will be more fully described later.

Figure 33A:
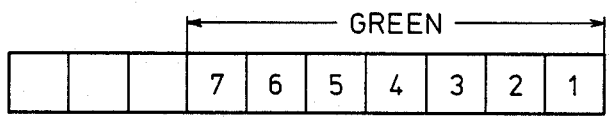
FIG. 33a shows how an exemplary local telephone number may be displayed.
Figure 33B:
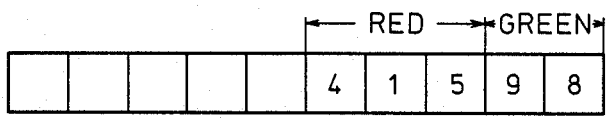
FIG. 33b shows how an incomplete long distance telephone number may be displayed.
Figure 33C:
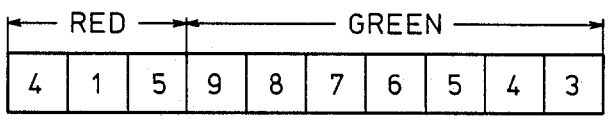
FIG. 33c shows how a complete long distance telephone number may be displayed.

By referring now to examples of displayed local and long distance telephone numbers, FIG. 33a shows an exemplary local telephone number displayed entirely in green color. FIG. 33b shows partially dialed long distance telephone number with its area code portion "415" displayed in red color and its incomplete local number portion displayed in green color. FIG. 33c is a like example showing the entire dialed long distance telephone number with its 3-digit area code portion displayed in red color and its complete 7-digit local number portion displayed in green color.

Figure 34:
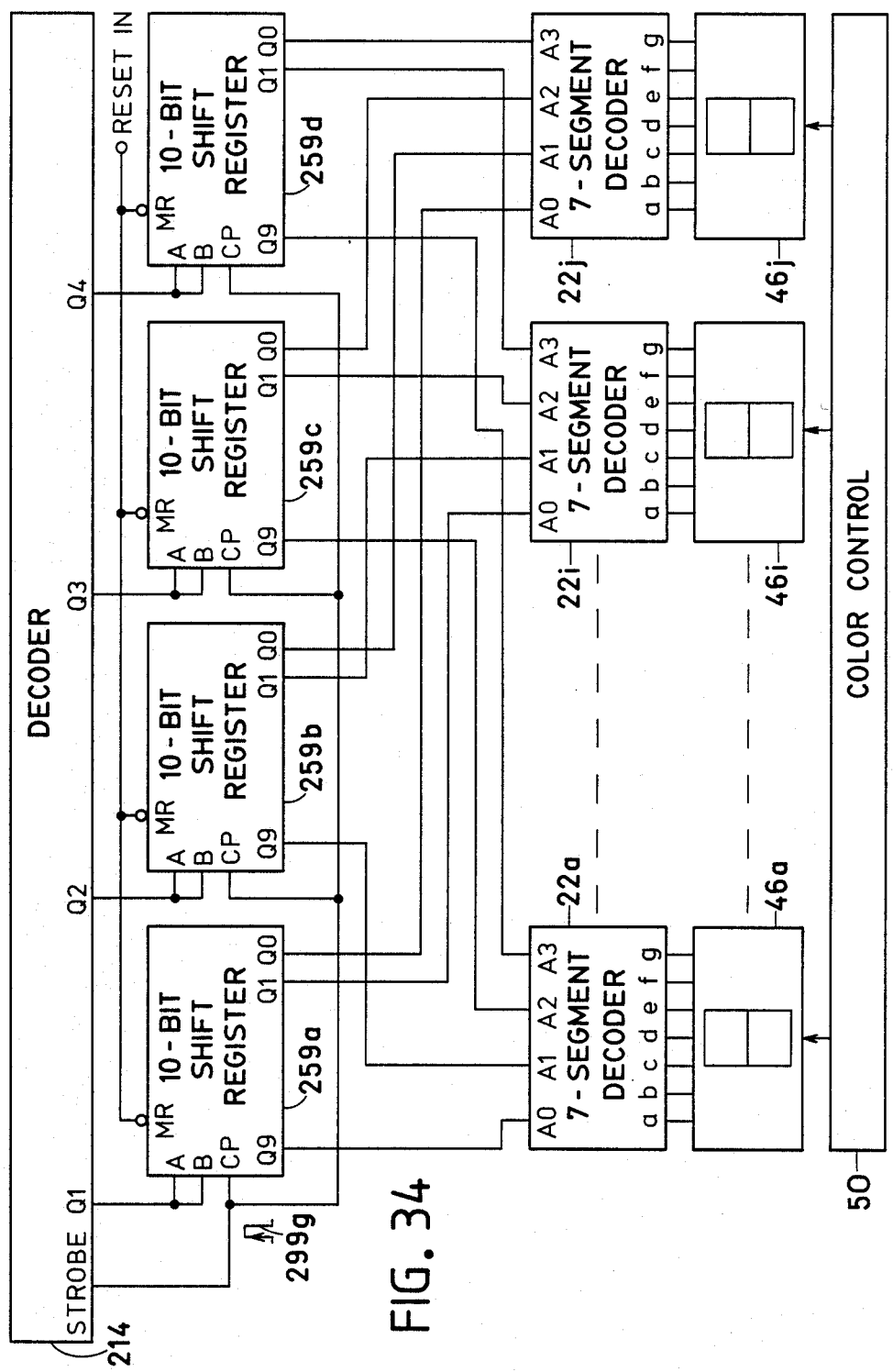
FIG. 34 is a schematic diagram of a variable color telephone display for long distance dialing.

As the schematic diagram of a variable color telephone display for long distance dialing shown in FIG. 34 is similar to that in FIG. 31, it will be described only briefly. The circuit in FIG. 34 essentially differs in that it includes ten display elements 46a to 46j with associated 7-segment decoders 22a to 22j connected to the outputs of the shift registers 259a to 259d such that the dialed digits are progressively moved on the display elements from right to left, in alignment with the dialing. The invention resides in the manner of controlling the color of the displayed digits. When a local telephone number is dialed, all digits is displayed in the same color. However, when a long distance telephone number is dialed, its area code portion is displayed in a first color, and its subsequent local number portion is displayed in a second color to facilitate visual verification.

Figure 35:
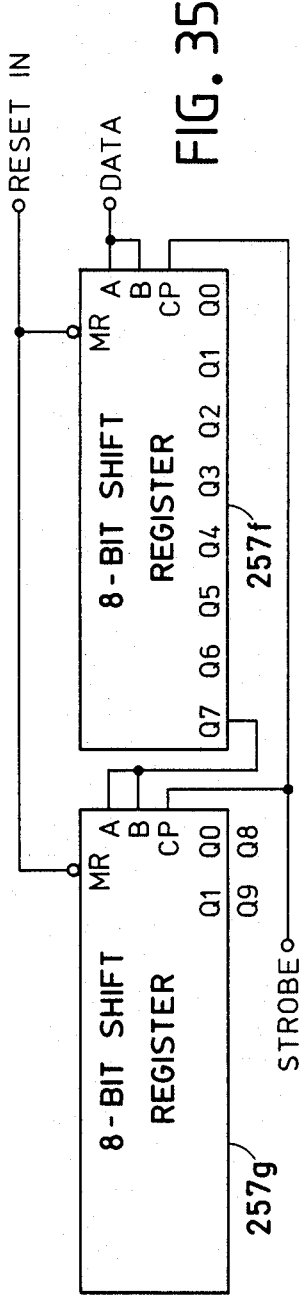
FIG. 35 is a detail of 10-bit shift register shown in FIG. 34.

As shown in detail in FIG. 35, the internal design of the 10-bit shift register 259 consists of two 8-bit shift registers combined such that the most significant output of the shift register 257f is connected to the inputs A, B of the shift register 257g, thereby providing the desired 2-bit extension.

Figure 36:
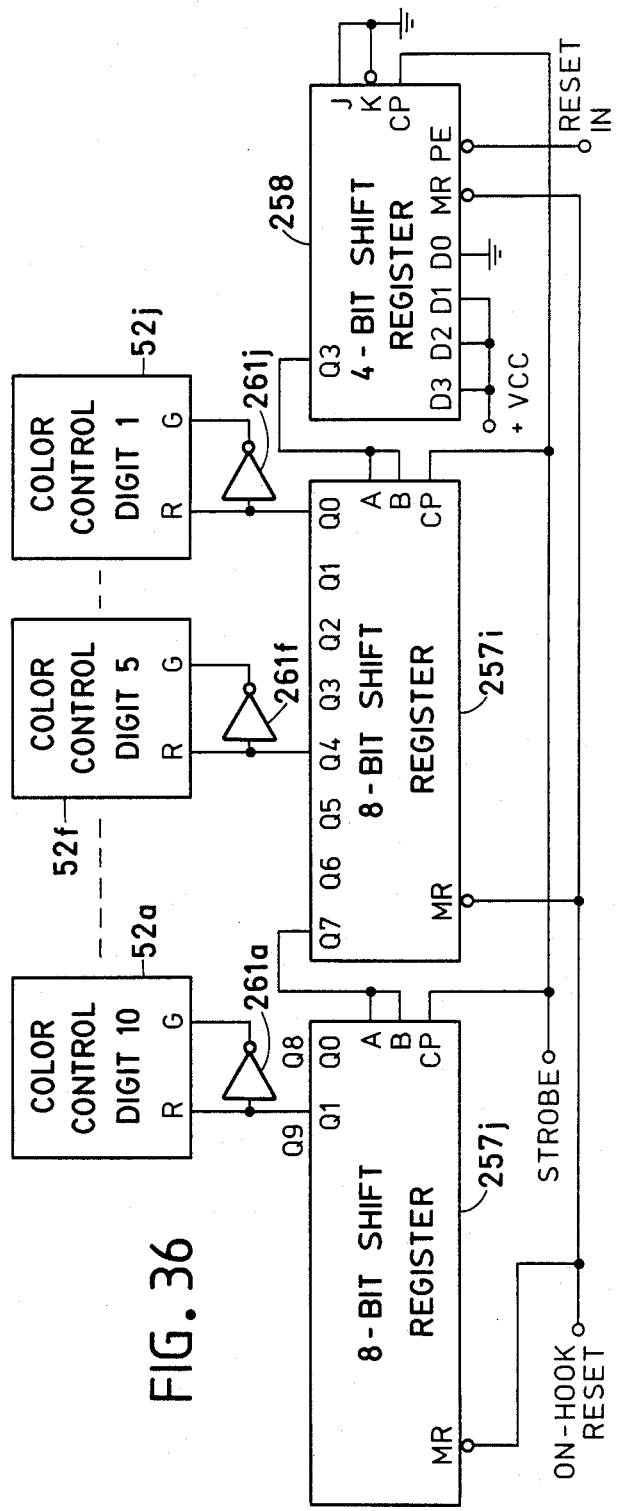
FIG. 36 is a detail of color control circuit for indicating dialed long distance telephone number.

In FIG. 36 is shown a schematic diagram of a color control circuit for shifting color control signals progressively from right to left, along with the shifting of associated displayed digits, such that each displayed dialed digit maintains its color when moved. The broken lines indicate that in reality there are ten color control circuits 52. The RESET IN input is connected to the RESET OUT output shown in FIG. 32, the STROBE input is connected to the STROBE output shown in FIG. 34, and the ON-HOOK RESET input is connected to the ON-HOOK RESET output shown in FIG. 32. When the first dialed digit is not "1", thereby indicating a local call, the RESET IN input remains inactive, causing all shift registers 257i, 257j, and 258 to remain reset as a result of previous active ON-HOOK RESET signal. Consequently, low logic levels are shifted through all shift registers with each STROBE pulse applied to the interconnected Clock Pulse inputs CP. All outputs Q0 to Q9 of the shift registers 257i and 257j are at a low logic level, thereby activating, via respective inverters 261a to 261j, color control inputs G (Green) of respective color control circuits 52a to 52j. As a result, the entire dialed local telephone number is displayed in green color.

When the first dialed digit is "1", thereby indicating a long distance call, the RESET OUT pulse 299e, shown in FIG. 32, activates the Parallel Enable input PE of the shift register 258, to load the data present at its inputs D0 to D3. Consequently, a low logic level appears at its output Q0, and high logic levels appear at is outputs Q1 to Q3. The three high logic levels, representing color control signals for expected 3-digit area code portion, are progressively shifted by each STROBE pulse, synchronously with the movement of corresponding digits displayed on the telephone display. Due to grounded inputs J and K of the shift register 258, the three high logic levels are followed by low logic levels, representing the expected local number portion, until the dialing is completed. A high logic level on a particular Q output of the 10-bit shift register activates R (Red) control input of the color control circuit 52 connected thereto; a low logic level activates via appropriate inverter 261 its G (Green) control input. The overall effect is that the dialed long distance telephone number moves from right to left on the display until it reaches its final position, with its area code portion being displayed in red color and its local number portion being displayed in green color, such that all displayed digits maintain their colors when moved. It would be obvious to those skilled in the art, in the view of this disclosure, that other color combinations may be readily obtained by differently interconnecting the shift register outputs and color control inputs.

Figure 37:
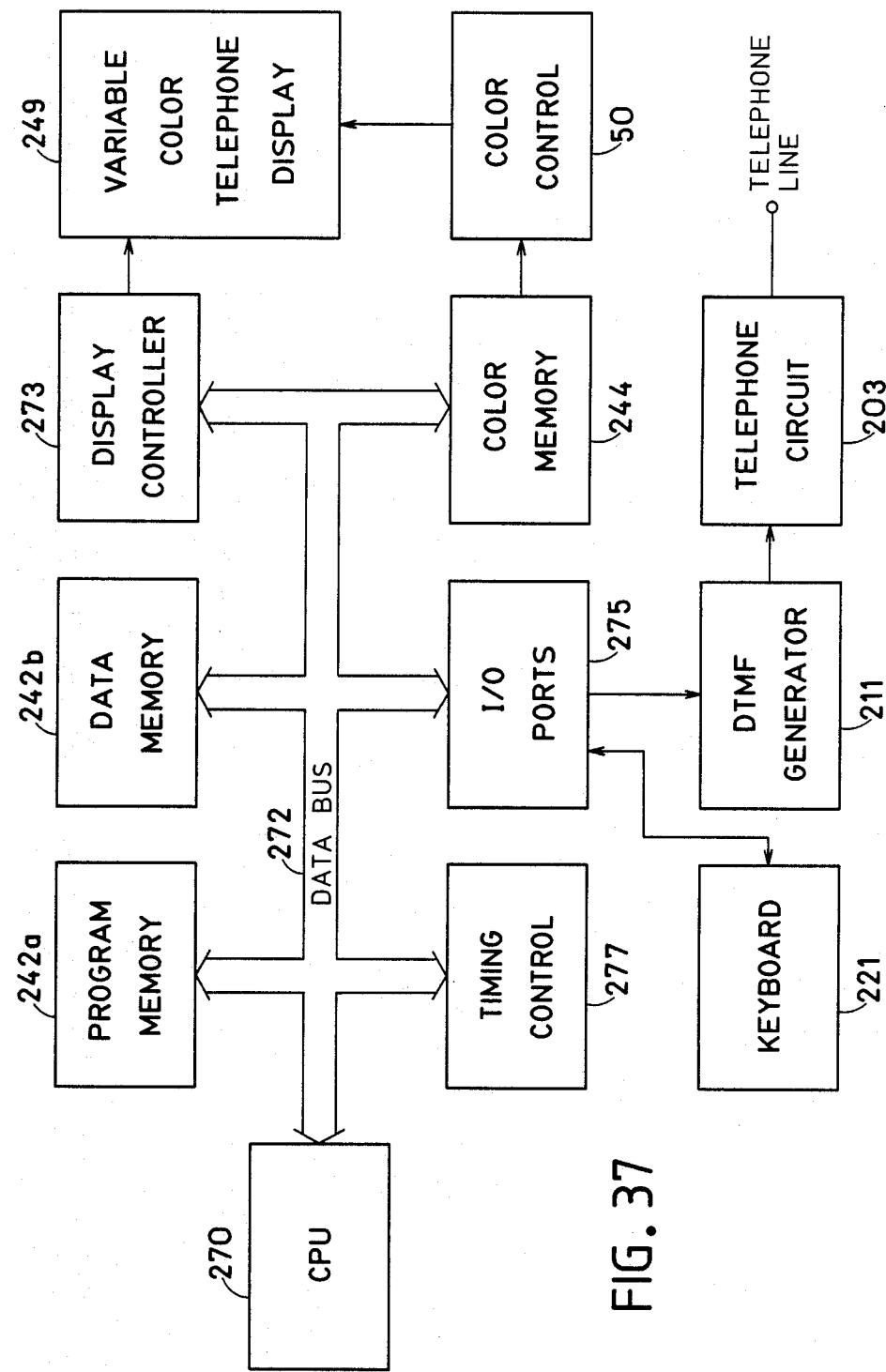
FIG. 37 is a block diagram of a variable color display telephone controlled by central processor.

Another embodiment of a variable color display telephone, disclosed in FIG. 37 in somewhat simplified form, is controlled by a CPU (Central Processing Unit) 270, which may include a microprocessor, microcomputer, or like device for processing a program of instructions. The instructions for controlling the CPU and tables of certain codes are stored in a program memory 242a. The CPU communicates with other devices over a data bus 272 and stores temporary data in a data memory 242b. The operation of the CPU controlled telephone will be outlined only briefly, with emphasis on the novel features provided by the invention. The CPU scans the keyboard 221 in cyclic sequence and reads back data indicative of the keyboard activity. When the CPU receives data indicating that a key has been actuated, it stops the scanning process and uses the received data to fetch from the program memory 242a, which contains the table of codes for all keys, the code for the character corresponding to the actuated key, so it could be displayed and transmitted over the telephone line. The CPU then accesses display controller 273, for causing the character to be displayed on the variable color telephone display 249, and DTMF generator 211, via appropriate I/O port 275, for causing the character to be converted to a standard pair of multi-frequency tones and transmitted over the telephone line for a time interval determined by timing control 277.

The invention resides in the addition of a color memory 244, color control 50, and certain software instructions for determining the type of a telephone call and for controlling the color of the telephone display 249 accordingly. To determine the type of a telephone call, the CPU interrogates the first dialed digit. However, it is readily apparent that the principles of the invention are equally applicable to other methods of determining the type of a telephone call.

When the code for the first dialed digit is received, the CPU compares it with predetermined values, defining either internal/external or local/long distance call. In accordance with such determination, the CPU then fetches from the program memory 242a, which contains the table of codes for all such possibilities, the binary code defining a particular color of the display corresponding to the determined type of a call and conveys the code to the color memory 244 to be stored therein and thence applied to the color control 50 for illuminating the variable color telephone display in the selected color.

By way of an example, and with reference to CHART 1, when the CPU receives the first digit "9", which indicates an external call, binary code 01 (CHART 1, line 1) is selected and conveyed to the color memory 269a shown in detail in FIG. 38. It is readily apparent that the binary code, when latched in the color memory, drives the color control line R to a high logic level, to thereby cause the telephone display, shown in detail in FIG. 41, to be illuminated in red color. When the first dialed digit is other than '9', which indicates an internal call, binary code 10 is conveyed to the color memory, to cause the telephone display to illuminate in green color.

By way of another example, when the CPU determines that a long distance telephone number is being dialed, e.g., by detecting leading digit "1", the course of actions depicted in CHART 2 takes place. In broad terms, the CPU accepts one dialed digit at a time and simultaneously generates its visual image on the telephone display and defines its color. The first three dialed digits, representing expected area code portions of the telephone number, are displayed in a first color, and the remaining seven dialed digits, representing expected local portion, are displayed in a second color. The CPU causes the displayed dialed digits to be moved on the telephone display together with their color control signals, in alignment with the dialing, such that each digit maintains its color when moved.

The operaton of the circuit will be explained on example of considering the first color to be purple and second color to be yellow, as will be more specifically pointed out subsequently. When the first dialed digit becomes available, the CPU sends binary code 00000001, referred to as low byte (CHART 2, line 1) to the color memory 269b, shown in detail in FIG. 39, and binary code 00, referred to as high byte, to the color memory 269c. The binary codes, when latched in the color memories, drive the output Q0 to a high logic level and all remaining outputs Q1 to Q9 to a low logic level, to thereby cause the first dialed digit displayed on the least significant element of the telephone display, shown in detail in FIG. 42, to be illuminated in purple color, as will be discussed in more detail below. When the remaining digits are successively dialed, the CPU sends appropriate low and high bytes to the display memories, as shown in CHART 2, to cause the first three dialed digits, corresponding to expected area code portion, to be visually presented in purple color, and to cause the remaining seven dialed digits, corresponding to local number portion, to be displayed in yellow color.

In the view of this disclosure, the composition of software commanding the CPU to determine the type of a telephone call and to control the color of the telephone display accordingly would be within the scope of ordinary skill.

In a detail of the color memory shown in FIG. 38, two least significant data bus lines D0 and D1 are applied to like inputs of the color memory 269a and may be latched therein by suitable transition at the data line D7. The need for latching is dictated by the fact that the data bus may carry at other times signals for other devices. The latched data appear at the outputs Q0 and Q1 as color control signals R and G, which may be respectively applied to like color control inputs illustrated in FIG. 41.

In a like detail of the color memory shown in FIG. 39, all eight data bus lines D0 to D7 are applied to interconnected inputs of the color memories 269b and 269c and may be selectively latched therein by suitable transition at the Clock Pulse input CP of either color memory 269b or 269c. The latched data appear at the outputs Q0 to Q9, which may be respectively applied to like inputs illustrated in FIG. 42.

Figure 40:
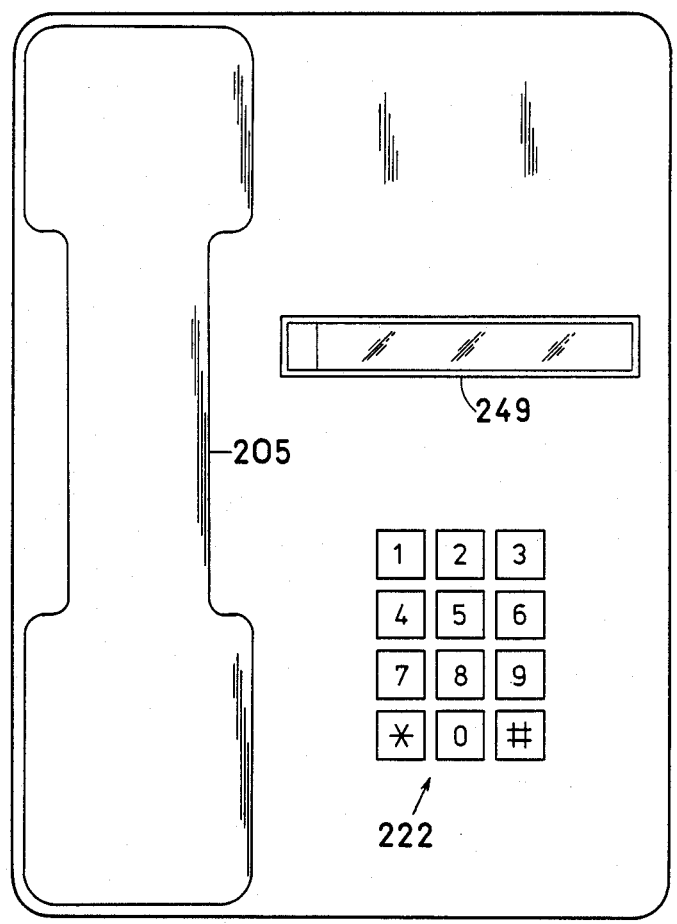
FIG. 40 is a top view of a variable color display telephone of this invention.

The telephone of this invention, portrayed in FIG. 40, includes substantially conventional keyboard 222 and handset 205. The telephone display 249 is formed of a plurality of variable color display elements mounted in a side by side relation such that dialed telephone numbers may be visually presented as indicated earlier. Although not specifically illustrated, it will be appreciated that the telephone display may be, alternatively, located adjacent the telephone or even remotely.

Figure 41:
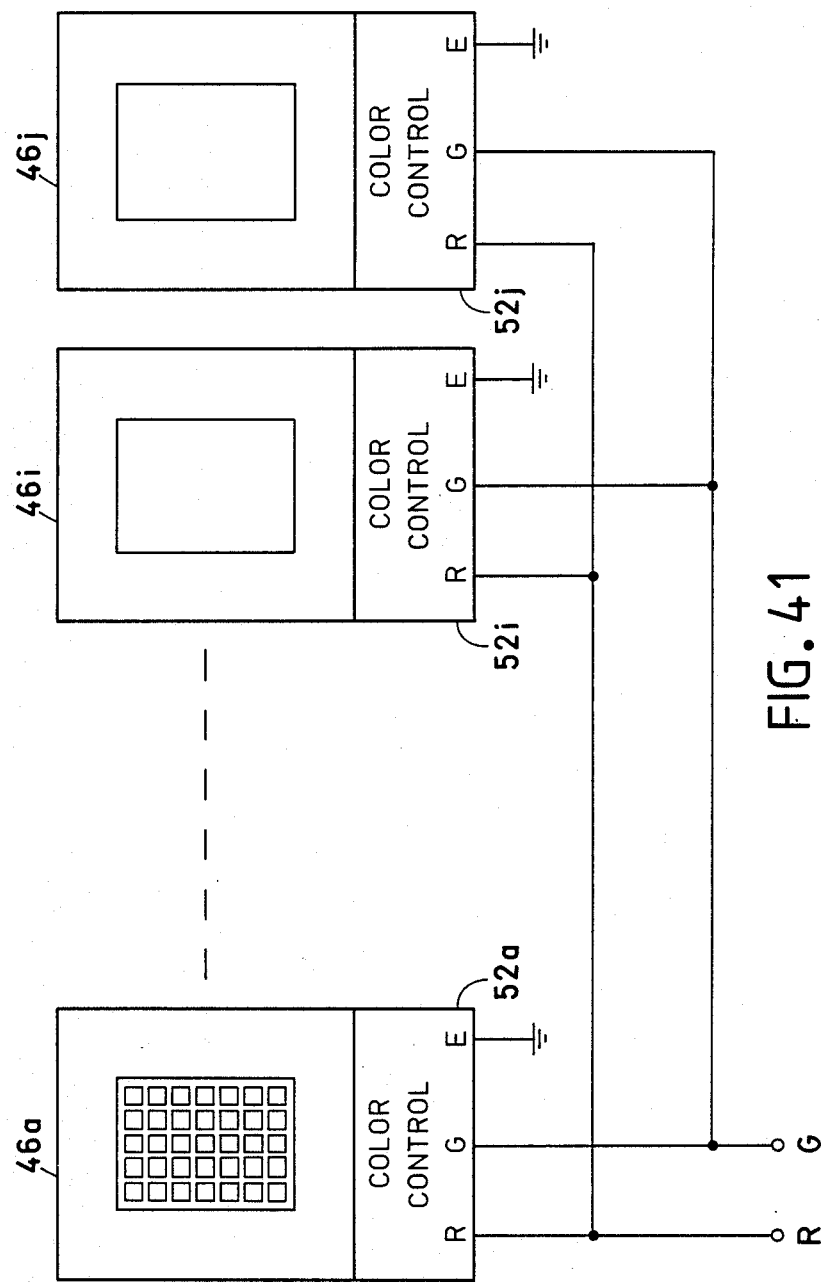
FIG. 41 is a detail of multi-element telephone display showing the interconnection of two step variable color display elements.

In the detail of the telephone display shown in FIG. 41, the broken lines indicate that in reality there may be more display elements than illustrated (e.g., ten). The display elements 46a to 46j use variable color display segments, such are those exposed in FIG. 7, arranged in 7 rows by 5 columns dot matrix, which may be selectively energized in different combinations to display all known alpha-numeric characters. The color control inputs R and G of associated color controls 52a to 52j are respectively interconnected for controlling the color of all display elements uniformly in two steps. All enable inputs E, if used, are grounded to permit the display elements to be illuminated.

Figure 42:
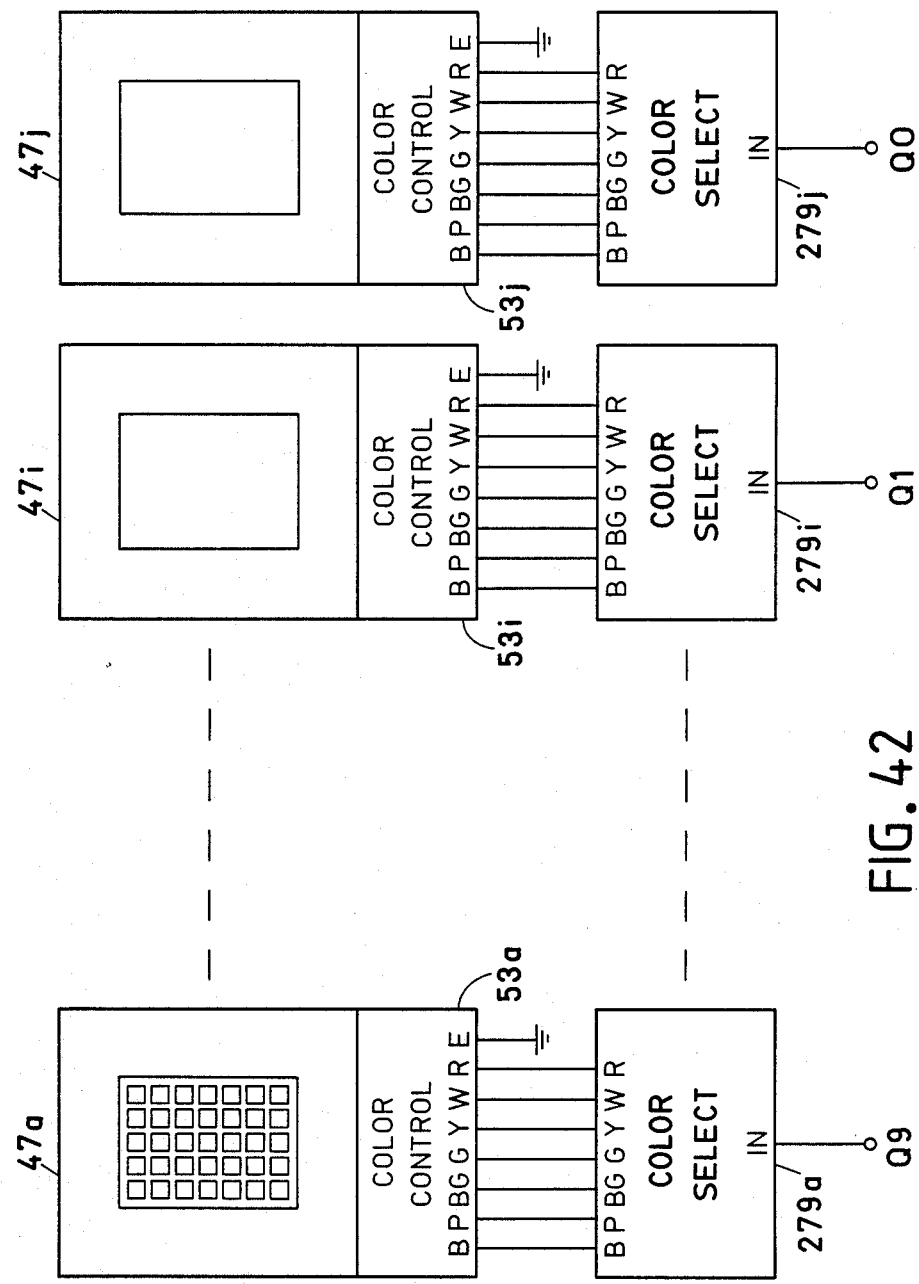
FIG. 42 is a detail of multi-element telephone display for selecting two of seven possible colors of the display.

In a like detail shown in FIG. 42, the display elements 47a to 47j use variable color display segments, such are those observed in FIG. 9, similarly arranged in a dot matrix. The color control inputs B, P, BG, G, Y, W, and R of associated color controls 53a to 53j are respectively connected to outputs of color select circuits 279a to 279*j* for selecting two colors out of seven, as will be more fully explained below.

Figure 43:
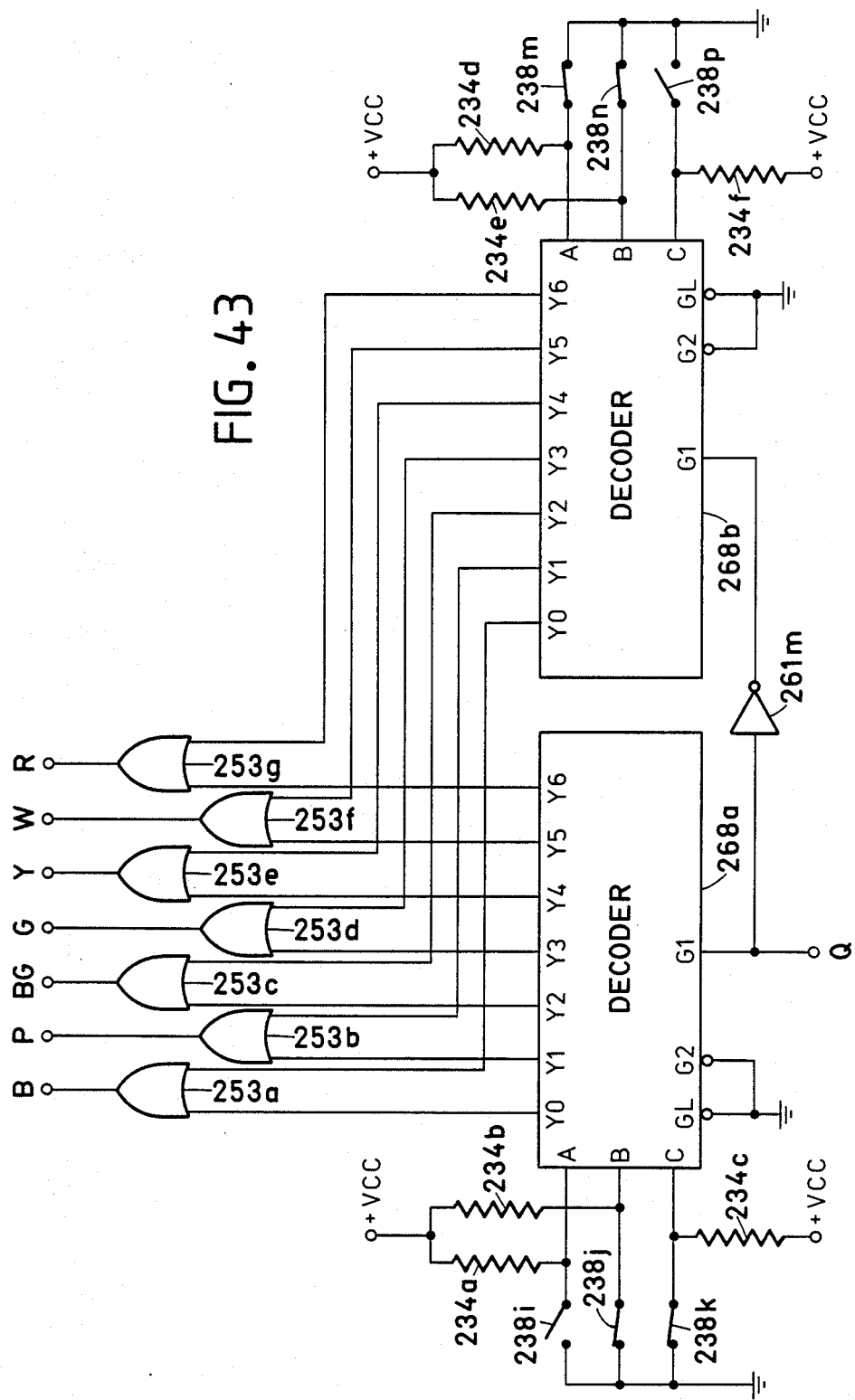
FIG. 43 is a detail of color select generally shown in FIG. 42.

In accordance with another aspect of the invention, in FIG. 43 is illustrated a color select circuit that allows the telephone user to select two out of seven possible colors to meet specific conditions or simply suit his fancy. As previously mentioned, the circuit will be explained on example of selecting purple and yellow colors. To accomplish this, the triad of binary switches 238*i* to 238*k*, used as a memory for the first selected color, is set to present binary code 001 at the select inputs A, B and C of a decoder 268*a*. Analogously, the triad of binary switches 238*m* to 238*p*, used as a memory for the second selected color, is set to present binary code 100 at like select inputs A, B, and C of the decoder 268*b*. When a high logic signal is imposed at the input Q, which is directly applied to the enable input G1 of the decoder 268*a*, it produces a high logic level at its output Y1 and, via OR gate 253*b*, at the color control output P (purple). In a similar fashion, a low logic signal at the input Q, which yields, via inverter 261*m*, a high logic level at the enable input G1 of the decoder 268*b*, produces a high logic level at its output Y4 and, via OR gate 253*e*, at the color control output Y (yellow). It is readily apparent that any other combinations of two colors may be selected by properly setting the binary switches. It will be appreciated that person skilled in the art may, alternatively, resort to use of other memory devices.

The circuitry contained in the telephone of the instant invention may be incorporated on a single chip fabricated by an LSI or VLSI technology, and may be powered by a battery, solar cell, internal or external power supply, telephone line power, or a combination thereof (not shown).

In summary, the invention describes a method and apparatus, in a telephone with variable color display, for displaying selectively dialed telephone number by causing it to be visually presented on the display in a color depending on the type of the telephone call, e.g., internal, external, local, long distance, and the like.

All matter herein described and illustrated in the accompanying drawings should be interpreted as illustrative and not in a limiting sense. It would be obvious that numerous modifications can be made in the construction of the preferred embodiments shown herein, without departing from the spirit of the invention as defined in the appended claims. It is contemplated that the principles of the invention may be also applied to numerous diverse types of display devices, such are liquid crystal, plasma devices, and the like.

CORRELATION TABLE

This is a correlation table of reference characters used in the drawings herein, their descriptions, and examples of commercially available parts.

| # | DESCRIPTION | EXAMPLE |
|---|---|---|
| 2 | red LED | |
| 3 | green LED | |
| 4 | blue LED | |
| 5 | red bus | |
| 6 | green bus | |
| 7 | blue bus | |
| 10 | device developing electric signals | |
| 15 | segment body | |
| 16 | light scattering material | |
| 20 | decoder | |
| 21 | digital decoder driver | |
| 22 | 7-segment display decoder driver | |
| 23 | common cathode 7-segment decoder | 74LS49 |
| 24 | common anode 7-segment decoder | 74LS47 |
| 30 | monochromatic display | |
| 40 | variable color display | |
| 42 | variable color 7-segment display (2 LEDs) | |
| 43 | variable color 7-segment display (3 LEDs) | |
| 46 | one variable color display character (2 LEDs) | |
| 47 | one variable color display character (3 LEDs) | |
| 50 | color control | |
| 51 | step variable color control | |
| 52 | color control (2 LEDs) | |
| 53 | color control (3 LEDs) | |
| 56 | continuously variable color converter | |
| 60 | 2-input OR gate | 74HC32 |
| 61 | 4-input OR gate | 4072 |
| 62 | non-inverting buffer | 74LS244 |
| 63 | inverting buffer | 74LS240 |
| 64 | inverter | part of 74LS240,4 |
| 69 | logic circuit | |
| 203 | telephone circuit | |
| 205 | handset | |
| 208 | dial pulse generator | |
| 211 | DTMF generator | |
| 214 | decoder | |
| 215 | DTMF decoder | |
| 216 | GTE DTMF decoder | G8870A |
| 217 | keyboard decoder | |
| 218 | Motorola keyboard decoder | 14419 |
| 220 | decoder & memory | |
| 221 | keyboard | |
| 222 | 4 rows × 3 columns keyboard | |
| 227 | crystal | |
| 231 | capacitor | |
| 233 | resistor | |
| 234 | resistor | |
| 238 | binary switch | |
| 239 | ON/OFF hook switch | |
| 240 | converter | |
| 241 | first digit detect circuit | |
| 242 | memory | |
| 243 | display memory | |
| 244 | color memory | |
| 245 | digit memory | |
| 246 | first digit memory | |
| 247 | digit counter | |
| 249 | variable color telephone display | |
| 251 | comparator | |
| 252 | 4-bit digital comparator | 74HC85 |
| 253 | 2-input OR gate | 74HC32 |
| 257 | 8-bit shift register | 74HC164 |
| 258 | 4-bit shift register | 74F195 |
| 259 | 10-bit shift register | |
| 260 | logic circuit | |
| 261 | inverter | 74HC04 |
| 264 | 3-input NAND gate | 74HC10 |
| 266 | D-type flip-flop | 74HC74 |
| 268 | 3-to-8 decoder | 74HC237 |
| 269 | 8-bit color memory | 74HC273 |
| 270 | central processor unit | 8049 |
| 272 | data bus | |
| 273 | display controller | |
| 275 | I/O ports | |
| 277 | timing control | |
| 279 | color select | |
| 299 | pulse | |

The examples of commercially available components should be considered as merely illustrative. It will be appreciated that other components may be readily and effectively used. The integrated circuits used in the description of the invention are manufactured by several well known companies, such are Fairchild Camera and Instrument Corporation, GTE Microcircuits, Intel Corporation, Motorola Semiconductor Products Inc., National Semiconductor Incorporated, Texas Instruments Incorporated, etc.

CHART 1

| FIRST DIALED DIGIT | BINARY CODE | COLOR |
|---|---|---|
| 9 | 01 | RED |
| OTHER | 10 | GREEN |

CHART 2

| DIALED DIGIT | HIGH BYTE | LOW BYTE | COLOR |
|---|---|---|---|
| 1 | 00 | 00000001 | P |
| 2 | 00 | 00000011 | PP |
| 3 | 00 | 00000111 | PPP |
| 4 | 00 | 00001110 | PPPY |
| 5 | 00 | 00011100 | PPPYY |
| 6 | 00 | 00111000 | PPPYYY |
| 7 | 00 | 01110000 | PPPYYYY |
| 8 | 00 | 11100000 | PPPYYYYY |
| 9 | 01 | 11000000 | PPPYYYYYY |
| 10 | 11 | 10000000 | PPPYYYYYYY |

What I claim is:

1. The method of displaying selectively dialed telephone number for establishing a telephone call of a selective type, on a variable color display means, by causing said dialed telephone number to be visually presented on said variable color display means and by controlling the color of said variable color display means in accordance with the type of said telephone call.

2. In a telephone device, the combination comprising:
dialing means for selectively dialing a telephone number to establish a telephone call of a selective type;
variable color display means for (visually presenting said) providing an indication of the dialed telephone number;
means for determining the type of a telephone call in accordance with the dialed telephone number and for developing output signals accordingly; and
color control means responsive to said output signals for controlling the color of said (variable color display means) indication in accordance with the type of the telephone call.

3. In a telephone device, the combination comprising:
dialing means for selectively dialing a telephone number having a plurality of digits to establish a telephone call of a selective type, either a local telephone call or a long distance telephone call characterized by an area code portion and a local number portion, in accordance with the first dialed digit;
variable color display means including a plurality of variable color display elements for visually presenting the dialed digits;
means for interrogating the first dialed digit, by comparing it with a predetermined value defining a long distance telephone call, to determine the type of a telephone call;
color control means for controlling the color of said variable color display means in accordance with the result of such comparison:
when the first dialed digit is not equal to said predetermined value, thereby indicating a local telephone call, for causing images of all dialed digits to be visually presented on said variable color display means in the same color; and
when the first dialed digit is equal to said predetermined value, thereby indicating a long distance telephone call, for defining a first color for the first predetermined number of dialed digits, representing the expected area code portion of said telephone number, and for defining a second color for the second predetermined number of dialed digits, representing the expected local number portion of said telephone number, said first and second colors being different, to cause images of the dialed digits to be visually presented on said variable color display means and moved thereon in alignment with the dialing such that each displayed digit maintains its color when moved.

4. A method of displaying selectively dialed telephone number for establishing a telephone call of a selective type, on a variable color display means, by causing said dialed telephone number to be visually presented on said variable color display means and by controlling the color of said variable color display means in accordance with the type of said telephone call such that dialed telephone number for establishing a telephone call of a first type is displayed in a single color, and dialed telephone number for establishing a telephone call of a second type is displayed in two different colors, its first predetermined portion being displayed in a first color, and its second predetermined portion being displayed in a second color.

5. A method of displaying selectively dialed telephone number for establishing a telephone call of a selective type, either a local telephone call or a long distance telephone call characterized by an area code portion and a local number portion, on a variable color display means, by causing said dialed telephone number to be visually presented on said variable color display means and by controlling the color of said variable color display means in accordance with the type of said telephone call such that dialed telephone number for establishing a local telephone call is displayed in a single color, and dialed telephone number for establishing a long distance telephone call is displayed in two different colors, its area code portion being displayed in a first color, and its local number portion being displayed in a second color.

6. In a telephone device, the combination comprising:
dialing means for selectively dialing a telephone number to establish a telephone call of a selective type;
variable color display means for visually presenting said dialed telephone number;
means for determining the type of a telephone call in accordance with the dialed telephone number; and
color control means for controlling the color of said variable color display means in accordance with the type of the telephone call such that dialed telephone number for establishing a telephone call of a first type is displayed in a single color, and dialed telephone number for establishing a telephone call of a second type is displayed in two different colors, its first predetermined portion being displayed in a first color, and its second predetermined portion being displayed in a second color.

7. In a telephone device, the combination comprising:
dialing means for selectively dialing a telephone number to establish a telephone call of a selective type, either a local telephone call or a long distance telephone call characterized by an area code portion and a local number portion;
   variable color display means for visually presenting said dialed telephone number;
   means for determining the type of a telephone call in accordance with the dialed telephone number; and
   color control means for controlling the color of said variable color display means in accordance with the type of the telephone call such that dialed telephone number for establishing a local telephone call is displayed in a single color, and dialed telephone number for establishing a long distance telephone call is displayed in two different colors, its area code portion being displayed in a first color, and its local number portion being displayed in a second color.

8. In a telephone device, the combination comprising:
   dialing means for selectively dialing a telephone number having a plurality of digits to establish a telephone call of a selective type;
   variable color display means including a plurality of display elements for visually presenting respective dialed digits;
   means for determining the type of a telephone call in accordance with the dialed telephone number and for developing output signals accordingly;
   first moving means for moving the displayed dialed digits on said display elements in alignment with the dialing of the telephone number; and
   color control means responsive to said output signals for independently controlling the color of respective display elements, said color control means including second moving means for moving color control signals for respective display elements in alignment with the moving of the displayed dialed digits such that each displayed digit maintains its color when moved, said color control means either illuminating all said display elements in a first color or illuminating a predetermined number of said display elements in a second color and all remaining display elements in a third color, at least said second and third colors being different, in accordance with said output signals.

9. In a telephone device, the combination comprising:
   dialing means for selectively dialing a telephone number having a plurality of digits to establish a telephone call of a selective type in accordance with the first dialed digit;
   variable color display means including a plurality of display elements for visually presenting respective dialed digits;
   first dialed digit detect means for interrogating the first dialed digit to determine the type of a telephone call and for developing an output signal when said first dialed digit is equal to a predetermined value;
   first shift register means for shifting the displayed dialed digits on said display elements in alignment with the dialing of the telephone number, said first shift register means being responsive to said output signal for causing each said display element to be initialized when said output signal occurs; and
   color control means for independently controlling the color of respective display elements, said color control means including second shift register means for shifting color control signals for respective display elements in alignment with the shifting of the displayed dialed digits such that each displayed digit maintains its color when moved, said color control means being responsive to said output signal for illuminating all said display elements in a first color when said output signal does not occur, and for illuminating a predetermined number of said display elements in a second color and all remaining display elements in a third color when said output signal occurs, at least said second and third colors being different.

10. In a telephone device, the combination comprising:
    dialing means for selectively dialing a telephone number having a plurality of digits to establish a telephone call of a selective type;
    variable color display means including a plurality of variable color display elements for visually presenting the dialed digits;
    means for determining the type of a telephone call in accordance with the dialed telephone number and for developing output signals accordingly;
    color control means for controlling the color of said variable color display means in accordance with said output signals:
    when said output signals have a first value, thereby indicating a telephone call of a first type, for causing images of the dialed digits to be visually presented on said variable color display means in the same color; and
    when said output signals have a second value, thereby indicating a telephone call of a second type, for defining a first color for the first predetermined number of dialed digits and for defining a second color for the second predetermined number of dialed digits, said first and second colors being different, for causing images of the dialed digits to be visually presented on said variable color display means in two colors.

11. In a telephone device, the combination comprising:
    dialing means for selectively dialing a telephone number having a plurality of digits to establish a telephone call of a selective type;
    variable color display means for visually presenting the dialed digits;
    color memory means;
    central processor means for interrogating the dialed telephone number to determine the type of a telephone call and for accordingly storing codes representing a selected color in said color memory means;
    in accordance with the result of such comparison, when the dialed telephone number is of a first type, said central processor means further determines one of a plurality of codes, representing a selected color of said variable color display means, and conveys said code to said color memory means for causing images of the dialed digits to be visually presented on said variable color display means in the same color; and
    when the dialed telephone number is of a second type, said central processor means defines a first code, representing a first color for the first predetermined number of dialed digits, and defines a second code, representing a second color for the second predetermined number of dialed digits, said first and second colors being different, and conveys said first and second codes to said color memory means for causing images of the dialed digits to be visually presented on said variable color display means in two colors.

12. In a telephone device, the combination comprising:
- dialing means for selectively dialing a telephone number having a plurality of digits to establish a telephone call of a selective type, either a local telephone call or a long distance telephone call characterized by an area code portion and a local number portion;
- variable color display means for visually presenting the dialed digits;
- color memory means;
- central processor means for interrogating the first dialed digit by comparing it with a predetermined value defining a long distance call to determine the type of a telephone call and for accordingly storing codes representing a selected color in said color memory means;
- in accordance with the result of such comparison, when the first dialed digit is not equal to said predetermined value, thereby indicating a local telephone call, said central processor means further determines one of a plurality of codes, representing a selected color of said variable color display means, and conveys said code to said color memory means for causing images of the dialed digits to be visually presented on said variable color display means in the same color; and
- when the first dialed digit is equal to said predetermined value, thereby indicating a long distance telephone call, said central processor means defines a first color for the first predetermined number of dialed digits, representing the expected area code portion of said telephone number, and defines a second color for the second predetermined number of dialed digits, representing the expected local number portion of said telephone number, said first and second colors being different, and causes images of the dialed digits to be visually presented on said variable color display means and moved thereon in alignment with the dialing such that each displayed dialed digit maintains its color when moved.

* * * * *